US009678407B2

(12) United States Patent
Tanaka

(10) Patent No.: US 9,678,407 B2
(45) Date of Patent: *Jun. 13, 2017

(54) FOCAL-PLANE SHUTTER FOR CAMERA AND DIGITAL CAMERA EQUIPPED THEREWITH

(71) Applicant: Nidec Copal Corporation, Tokyo (JP)

(72) Inventor: Yasuo Tanaka, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/984,209

(22) Filed: Dec. 30, 2015

(65) Prior Publication Data

US 2016/0109782 A1 Apr. 21, 2016

Related U.S. Application Data

(63) Continuation of application No. 14/497,414, filed on Sep. 26, 2014, now Pat. No. 9,229,296.

(30) Foreign Application Priority Data

Sep. 27, 2013 (JP) ................................. 2013-201310

(51) Int. Cl.
H04N 5/235 (2006.01)
G03B 9/58 (2006.01)
G03B 9/42 (2006.01)
H04N 5/225 (2006.01)

(52) U.S. Cl.
CPC ................. *G03B 9/58* (2013.01); *G03B 9/42* (2013.01); *H04N 5/2254* (2013.01); *H04N 5/2353* (2013.01)

(58) Field of Classification Search
CPC ................................ G03B 9/10; H04N 5/2353
See application file for complete search history.

(56) References Cited

U.S. PATENT DOCUMENTS

| 6,850,281 | B2 | 2/2005 | Takahashi |
| 8,011,838 | B2 * | 9/2011 | Sakai ...................... G03B 9/08 396/488 |
| 8,197,150 | B2 | 6/2012 | Yamaguchi et al. |
| 2001/0010560 | A1 | 8/2001 | Takahashi |
| 2011/0129212 | A1 | 6/2011 | Yamaguchi et al. |

FOREIGN PATENT DOCUMENTS

| JP | 2001-215555 | 8/2001 |
| JP | 2011-113060 | 6/2011 |
| JP | 2011-137986 | 7/2011 |

* cited by examiner

Primary Examiner — Gary C Vieaux
(74) Attorney, Agent, or Firm — Troutman Sanders LLP

(57) ABSTRACT

A focal plane shutter is provided with a switching mechanism having an electromagnet and a stopping member. The stopping member is provided with an engaging portion able to lock an engagement portion provided in a first driving member for a leading edge, and an operating portion wherein a direction of a force, in relation to the electromagnet, switches, in accordance with switching between an application and removal of an electric current in a single direction to the electromagnet, so as to move the engaging portion to a position wherein it is able to release locking of the engagement portion when the electric current is applied, and to move the engaging portion to a position wherein it is able to lock the engagement portion when the electric current is removed.

20 Claims, 21 Drawing Sheets

FOCAL-PLANE SHUTTER FOR CAMERA AND DIGITAL CAMERA EQUIPPED THEREWITH

CROSS REFERENCE TO RELATED APPLICATIONS

This application is a continuation of U.S. patent application Ser. No. 14/497,414, filed Sep. 26, 2014, which claims the benefit of Japanese Patent Application No. 2013-201310, filed Sep. 27, 2013, each of which is incorporated by reference herein in its entireties.

FIELD OF TECHNOLOGY

The present invention relates to a focal plane shutter for a camera and to a digital camera equipped therewith.

BACKGROUND

At present, focal plane shutters are commonly used that employ imaging using a normally open system for a camera wherein, when capturing an image, one or more blade groups is driven to expose a photosensitive surface, and then, during standby, the image frame is opened, and the image is read in. Given this, in a focal plane shutter that employs image capturing using a normally open system, the use of a switching mechanism has been proposed to enable switching to image capturing in a normally closed system, wherein the image frame is closed during standby after the exposing operation.

Furthermore, shutters, such as those set forth in Japanese Unexamined Patent Application Publication Nos. 2011-137986 ("the JP '986") and Japanese Unexamined Patent Application Publication 2011-113060 ("the JP '060"), are focal plane shutters that are currently used in cameras.

The focal plane shutters set forth in the JP '986 and the JP '060 are structured with a stopping member, provided with a movable element that can move in a rotational direction of a permanent magnet rotor, solenoid, or the like, or can undergo reciprocating action in a straight line direction, for preventing movement of a leading blade in the closing direction, to cause the exposure opening to be in an open state when in an image capturing standby state, and for releasing this prevention of movement of the leading blade in the closing direction at the time of imaging, structured from an electromagnetic device for moving the movable element in a direction that prevents the movement of the leading blade in the closing direction, or for moving the movable element in a direction that releases this prevention, through applying electric currents in two directions to a coil that is provided on the movable element. Given this, through switching the direction in which the electric current is applied to the coil of the movable element that is able to cause the reciprocating action of the stopping member that is made from an electromagnetic device at this time, the imaging in the normally open system is carried out by switching a first driving member for the leading blade into or out of an operating track of the portion that is to be stopped.

However, the use of a solenoid and/or permanent magnet rotor in a switching mechanism, as in the focal plane shutter set forth in the JP '986 and the JP '060, increases the cost. Moreover, the range of movement of the movable element in the permanent magnet rotor is limited, so the flexibility in the configuration is low. Moreover, because there is switching of the electric current in two directions in the electromagnetic device, the electric power consumption is increased commensurately.

The present invention was created in order to solve such a problem areas, and an aspect thereof is to provide a focal plane shutter for a camera, and a digital camera equipped therewith, wherein the cost of the switching mechanism is low, the flexibility of configuration of the actuator is high, and the electric power consumption is low, in a focal plane shutter of a type wherein it is possible to switch between imaging using a normally open system and imaging using a normally closed system.

SUMMARY

In order to achieve such an aspect set forth above, a focal plane shutter for a camera according to the present invention has driving means for a leading blade, structured from a first driving member for the leading blade for driving a leading blade group in the direction of closing an exposure opening, through rotation by a biasing force of a set spring, and a second driving member for the leading blade, for driving the leading blade group in the direction of opening the exposure opening, through pushing the first driving member for the leading blade against the biasing force of the set spring through rotation through a biasing force of a driving spring for the leading blade, and comprising a switching mechanism for switching between imaging in a normally open system wherein the image frame is opened during standby after an exposing operation or to a normally closed system wherein the image frame is closed during standby after an exposing operation, through switching between stopping, or releasing the stop, of rotation in the direction of closing the exposure opening by the leading blade through the first driving member for the leading blade wherein: the switching mechanism comprises: an electromagnet wherein an electric current is applied in only a single direction; and a stopping member having an engaging portion able to lock an engagement portion that is provided in the first driving member for the leading edge, and an operating portion wherein the direction of a force, in relation to an electromagnet, switches, in accordance with the switching of the application or removal of an electric current in the single direction to the electromagnet, so as to move the engaging portion to a position wherein it is able to release locking of the engagement portion when the electric current is applied and to move the engaging portion to a position wherein it can lock the engagement portion when the electric current is removed, wherein: after an exposing operation and prior to a standby operation, the rotation of the first driving member for the leading blade in the direction wherein the leading blade closes the exposure opening is switched between being stopped, and the stop being released, depending on the locking, or the release of the locking, of the engagement portion by the engaging portion.

Additionally, in the focal plane shutter for a camera according to the present invention, preferably: the stopping member is able to rotate centered on a shaft, and has an engaging portion on one end and a first permanent magnet on the other end; the operating portion is made from the first permanent magnet; when an electric current in the single direction is applied to the electromagnet, the electromagnet has a repulsive force in relation to the first permanent magnet, so by rotating the stopping member in the direction of releasing the locking of the engaging portion to the engagement portion, through the repulsive force of the first permanent magnet in relation to the electromagnet, and through the stopping member rotating, through the attractive force of the first permanent magnet to the electromagnet when the electric current to the electromagnet is removed, in the direction wherein the engaging portion locks to the engagement portion.

Moreover, in the focal plane shutter for a camera according to the present invention, preferably: the electromagnet comprises a second permanent magnet that has a repulsive force relative to the first permanent magnet; wherein, when an electric current is applied in the single direction to the electromagnet, a magnetic force that cancels the repulsive force of the second permanent magnet in relation to the first permanent magnet is produced, so the stopping member is rotated, by the attractive force of the first permanent magnet in relation to the electromagnet, in the direction of releasing the locking of the engagement portion by the engaging portion, and when the electric current is removed from the electromagnet, the stopping member is rotated, through the repulsive force of the second permanent magnet in relation to the first permanent magnet, in the direction wherein the engaging portion locks the engagement portion.

Additionally, in the focal plane shutter for a camera according to the present invention, preferably the stopping member is able to rotate around a shaft, having the engaging portion on one end thereof and provided with a ferromagnetic portion on the other end thereof, comprising, additionally, a spring for biasing the other end in a direction away from the electromagnet, where the operating portion is made from the ferromagnetic portion and the spring for biasing the other hand in the direction away from the electromagnet, wherein, when an electric current is applied in the single direction to the electromagnet, the electromagnet has an attractive force in relation to the ferromagnetic portion, so the stopping member is rotated by the attractive force of the ferromagnetic portion in relation to the electromagnet, against the biasing force of the spring that biases in the direction away from the electromagnet, in the direction for releasing the locking of the engaging portion to the engagement portion, and when the electric current is removed from the electromagnet, the stopping member is rotated, by the force of the spring that biases in the direction away from the electromagnet, in a direction wherein the engaging portion locks the engagement portion.

Moreover, in the focal plane shutter for a camera according to the present invention, preferably: the first driving member for the leading blade has a pushing portion on the outside of the engagement portion; and the stopping member has a pushed portion to the outside of the engaging portion; wherein, in a state wherein the stopping member is at a position wherein the engaging portion can lock the engagement portion of the first driving member for the leading blade, then when the first driving member for the leading blade is rotated so that the leading blade group is driven in the direction of opening the exposure opening, the pushing portion of the first driving member for the leading blade pushes back the pushed portion of the stopping member, and the engagement portion of the first driving member for the leading blade is locked by the engaging portion.

Furthermore, the digital camera according to the present invention is provided with any of the focal plane shutters for cameras as set forth above.

Given the present invention, the switching mechanism comprises: an electromagnet to which an electric current is applied in only a single direction; and a stopping member having an engaging portion able to lock an engagement portion that is provided on the first driving member for the leading blade, and an operating portion wherein the direction of force, in relation to the electromagnet, is switched in accordance with the switching between the electric current, in the single direction, being applied to the electromagnet or removed from the electromagnet, to be moved to a position wherein the lock of the engaging portion with the engagement portion can be released when the electric current is applied, and moved to a position wherein the engaging portion can be locked to the engagement portion when the electric current is removed; wherein, depending on whether the engagement portion is locked by the engaging portion, or on whether this locking is released, after an exposing operation and prior to standing by, the rotation of the leading blade, relative to the first driving member of the leading blade in the direction so as to close the exposure opening is switched between stopped and the stop being released, thus enabling a reduction in cost in the switching mechanism relative to a structure that uses a permanent magnet rotor and a solenoid, as in the JP '986 and the JP '060. Moreover, the flexibility of configuration is not limited as it is with a permanent magnet rotor. Furthermore, because the directions of the electric current to the electromagnet in order to switch between the stopping member engaging portion being locked to the engagement portion or releasing that locking is performed when the direction of the electric current that is applied to the electromagnet being in only a single direction, the electric current in the single direction when the stopping member is locked to the engagement portion through the engaging portion is controlled to be an electric current that is applied in the single direction only when locking or releasing, and thus the time over which the electric current is applied is reduced, making it possible to reduce the electric power consumption.

Additionally, in the focal plane shutter for a camera according to the present invention: the stopping member is able to rotate centered on a shaft, and has an engaging portion on one end and a first permanent magnet on the other end; the operating portion is made from the first permanent magnet; when an electric current in the single direction is applied to the electromagnet, the electromagnet has a repulsive force in relation to the first permanent magnet, so by rotating the stopping member in the direction of releasing the locking of the engaging portion to the engagement portion, through the repulsive force of the first permanent magnet in relation to the electromagnet, and through the stopping member rotating, through the attractive force of the first permanent magnet to the electromagnet when the electric current to the electromagnet is removed, in the direction wherein the engaging portion locks to the engagement portion, makes it possible to reduce the member of components in the switching mechanism.

Moreover, in the focal plane shutter for a camera according to the present invention, additionally: the electromagnet comprises a second permanent magnet that has a repulsive force relative to the first permanent magnet; wherein, when an electric current is applied in the single direction to the electromagnet, a magnetic force that cancels the repulsive force of the second permanent magnet in relation to the first permanent magnet is produced, so the stopping member is rotated, by the attractive force of the first permanent magnet in relation to the electromagnet, in the direction of releasing the locking of the engagement portion by the engaging portion, and when the electric current is removed from the electromagnet, the stopping member is rotated, through the repulsive force of the second permanent magnet in relation to the first permanent magnet, in the direction wherein the engaging portion locks the engagement portion, enabling the direction of rotation of the stopping member, through application of the electric current in the single direction to the electromagnet, to be designed to be either in the repulsive direction of the electromagnet or in the attractive direction of the electromagnet, thus increasing the flexibility in design.

Additionally, in the focal plane shutter for a camera according to the present invention, the stopping member is able to rotate around a shaft, having the engaging portion on one end thereof and provided with a ferromagnetic portion on the other end thereof, comprising, additionally, a spring for biasing the other end in a direction away from the electromagnet, where the operating portion is made from the ferromagnetic portion and the spring for biasing the other hand in the direction away from the electromagnet, wherein, when an electric current is applied in the single direction to the electromagnet, the electromagnet has an attractive force in relation to the ferromagnetic portion, so the stopping member is rotated by the attractive force of the ferromagnetic portion in relation to the electromagnet, against the biasing force of the spring that biases in the direction away from the electromagnet, in the direction for releasing the locking of the engaging portion to the engagement portion, and when the electric current is removed from the electromagnet, the stopping member is rotated, by the force of the spring that biases in the direction away from the electromagnet, in a direction wherein the engaging portion locks the engagement portion, thus achieving a structure wherein no magnet is used in the stopping member.

Moreover, in the focal plane shutter for a camera according to the present invention: the first driving member for the leading blade has a pushing portion on the outside of the engagement portion; and the stopping member has a pushed portion to the outside of the engaging portion; wherein, in a state wherein the stopping member is at a position wherein the engaging portion can lock the engagement portion of the first driving member for the leading blade, then when the first driving member for the leading blade is rotated so that the leading blade group is driven in the direction of opening the exposure opening, the pushing portion of the first driving member for the leading blade pushes back the pushed portion of the stopping member, and the engagement portion of the first driving member for the leading blade is locked by the engaging portion, thus enabling the frequency with which the electric current is applied to the electromagnet in the single direction in order to lock the engagement portion of the first driving member for the leading blade using the stopping member, and the frequency with which the electric current is removed, to be reduced, enabling a reduction in the time over which the electric current is applied, thus reducing electric power consumption.

Because of this, the present invention makes it possible to provide a focal plane shutter of a type wherein it is possible to switch between imaging using a normally open system and imaging using a normally closed system, wherein the cost of the switching mechanism is low and the flexibility of the configuration of the actuator is high, and wherein the electric power consumption is low, and possible to provide a digital camera equipped with the same.

DETAILED DESCRIPTION

Examples according to the present invention will be explained through the examples that are illustrated. These examples apply the present invention to a structure of a direct-type focal plane shutter; however, the present invention can also be applied to a shutter of a lock type.

Example

Figure 1:
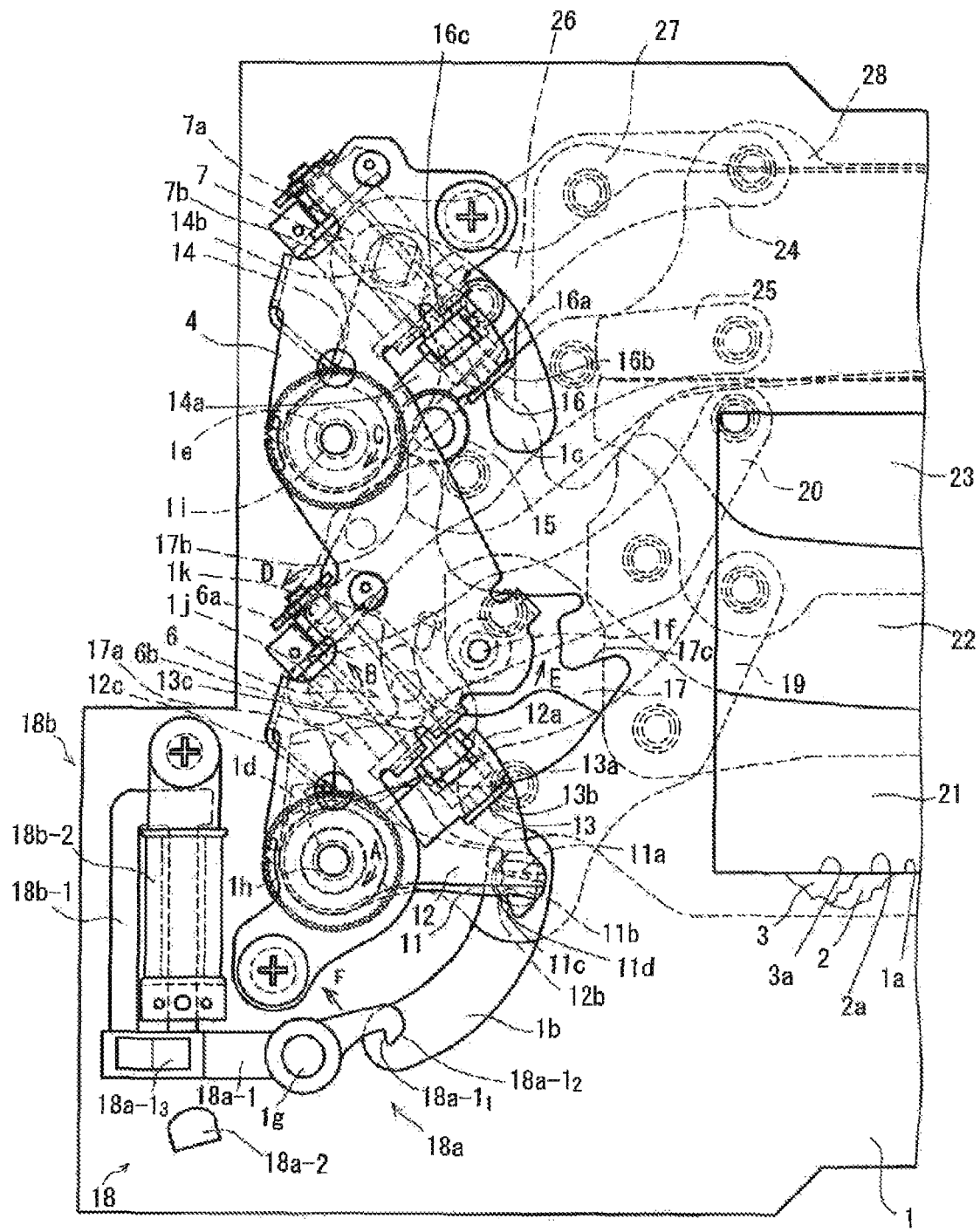
FIG. 1 is a plan view diagram enlarging the about half on the left side, when viewed from the photographic subject side, viewing a state wherein, when capturing an image in the normally open system in a focal plane shutter for a camera according to Example according to the present invention, after the setting operations have been completed, the release button is pressed, a control lever moves out of the travel path for the engagement portion of the first driving member for the leading blade, the lock with the first driving member of the leading blade is unlocked, and the leading blade returns to the position that covers the exposure opening, after which the control lever has moved into the travel path of the engagement portion of the first driving member of the leading blade.

First the structure of Example according to the present invention will be explained using, primarily, FIG. 1 and FIG. 2. FIG. 1 is a plan view diagram enlarging the about half on the left side, when viewed from the photographic subject side, viewing a state wherein, when capturing an image in the normally open system in a focal plane shutter for a camera according to the Example according to the present invention, after the setting operations have been completed, the release button is pressed, a control lever moves out of the travel path for the engagement portion of the first driving member for the leading blade, the lock with the first driving member of the leading blade is unlocked, and the leading blade returns to the position that covers the exposure opening, after which the control lever has moved into the travel path of the engagement portion of the first driving member of the leading blade. Note that in the explanation of the present example, when the focal plane shutter according to the present invention is assembled together with the camera, the explanation will assume that the surface side in FIG. 1 (the near side) is the photographic subject side (the imaging lens side), and the back face side in FIG. 1 is the imaging element side. However, in the case of a digital camera, as well known, the surface side in FIG. 1 may be put on the imaging element side, and the back face side in FIG. 1 may be put on the photographic subject side.

In FIG. 1, an opening portion 1a for exposure is formed in a rectangle, which is long in the crosswise direction, in essentially the center portion of a shutter bottom board 1. Moreover, a middle board 2 and an auxiliary bottom board 3 are sequentially attached to the back face side of the shutter bottom board 1 with a prescribed spacing therebetween, where the space between the shutter bottom board 1 and the middle board 2 structures a blade chamber for the leading blade, and the space between the middle board 2 and the auxiliary bottom board 3 structures a blade chamber for the trailing blade. Given this, opening portions 2a and 3a that are similar to the opening portion 1a are formed also in the middle board 2 and the auxiliary bottom board 3. Given this, the shape of the exposure opening, as a shutter unit for enabling the transmission of light from the photographic subject, may be formed from two or more of these opening portions 1a, 2a, and 3a, but in the present example, the shape of the exposure opening is determined by the opening portion 1a alone.

Note that the shutter bottom board 1 in the present example is manufactured from a synthetic resin. Moreover, FIG. 1 is illustrated with a region in the vicinity of the opening portion 1a of the shutter bottom board 1 intentionally cut away so as to enable portions of the middle board 2 and of the auxiliary bottom board 3 to be visible. Furthermore, in this FIG. 1, the external shapes of the middle board 2 and the auxiliary bottom board 3 are not illustrated, as they are the same as the external shape of the shutter bottom board 1, which is true also for FIG. 2 through FIG. 7.

Two arc-shaped elongated holes 1b and 1c are formed in regions on the left side of the opening portion 1a in the shutter bottom board 1. Although not illustrated, well-known sock-absorbing members, made of rubber, wherein the planar shapes form essentially C shapes, for example, are attached to both end portions of the elongated hole 1b and the bottom end portion of the elongated hole 1c. Moreover, the middle board 2 and the auxiliary bottom board 3 are thin board members, and, although not illustrated, elongated holes of essentially the same shapes are formed therein so as to overlay the regions wherein the elongated holes 1b and 1c are formed, and, actually, are in essentially the same shapes so as to overlay these elongated holes 1b and 1c.

Shafts 1d, 1e, 1f, and 1g protrude from the surface side, that is, the photographic subject side, of the shutter bottom board 1. Furthermore, shafts 1h, 1i, 1j, and 1k protrude from the back face side, that is, the imaging element side, of the shutter bottom board 1, and, of those, shafts 1h and 1i protrude concentrically with shafts 1d and 1e.

Actually, there is a plurality of columns, aside from these, protruding from the surface side of the shutter bottom board 1, where a supporting board 4 and a printed interconnecting board, not illustrated, are attached to the tip ends thereof, with the supporting board 4 on the shutter bottom board 1 side, where, on the shutter bottom board 1 side of this supporting board 4, a leading blade electromagnet 6 and a trailing blade electromagnet 7, structured, respectively, from core members 6a and 7a wherein the tip ends of two leg portions, which have essentially U shapes, are formed as magnetic pole portions, and bobbin portions 6b and 7b, wherein coil members are wound and fitted onto one leg portion of each of the core members.

A first driving member 11 for the leading blade and a second driving member 12 for the leading blade, which structure a driving mechanism for the leading blade, and which are both manufactured from synthetic resin, are attached so as to be able to rotate independently, with the first driving member 11 for the leading blade on the shutter bottom board 1 side, to the shaft 1d that protrudes from the surface side of the shutter bottom board 1. Note that of these, the shape of the first driving member 11 for the leading blade is illustrated in a more easily understood way in FIG. 5 than in FIG. 1.

The first driving member 11 has a pushed portion 11a, a driving pin 11b, an engagement portion 11c and a pushing portion 11d. Of these various positions, the pushed portion 11a and the driving pin 11b are formed so as to overlap at the surface side and the back face side, where the driving pin 11b that is formed on the back face side is inserted into the elongated hole 1b of the shutter bottom board 1. Given this, the driving pin 11b has a cross section that is circular at the position on the blade root side, and the arced surface thereof is able to contact the shock absorbing members, not illustrated, that are attached to both end portions of the elongated hole 1b. Moreover, the cross section at the position on the tip end side is shaped as an artillery shell, and is connected to the leading blade within the blade chamber, as described below, where the tip-most end portion is inserted into elongated holes, not illustrated, that are shaped essentially identically to the elongated hole 1b, formed in the middle board 2 and the auxiliary bottom board 3. Note that the cross section of the driving pin 11b at the position of the blade root side may be a D shape instead. Moreover, the cross-sectional shape at the position of the tip end side of the driving pin 11b may be an oval shape instead. The pushed portion 11a is formed as a hemispherical surface. Moreover, a raised portion that is essentially a triangular column shape is formed on the outer edge region in the blade root side end face of the driving pin 11b. The face on the inner surface of the triangular column in the raised portion (on the top end side of the elongated hole 1b) functions as the engagement portion 11c, so as to be able to lock to the engaging portion 18a-11 of the control lever 18a-1, described below. The face of the triangular column that is positioned further to the outside than the engagement portion 11c in the raised portion (on the bottom end side of the elongated hole 1b) functions as the pushing portion 11d, and is formed so as to be able to push the pushed portion 18a-12 of the control lever 18a-1.

On the other hand, the second driving member 12 for the leading blade has an attaching portion 12a that is formed so that the portion on the photographic subject side is thick, a pushing portion 12b, and a pushed portion 12c. Given this, it is biased so as to be rotated in the clockwise direction (in the direction of the arrow A around the shaft 1d in FIG. 1) by the biasing force of a driving spring for the leading blade, such as is a customary practice, not illustrated. As is a customary practice, an iron piece member 13 and a compression spring, not illustrated, are housed within the attaching portion 12a. The pushing portion 12b is positioned so as to push the pushed portion 11a, provided in the first driving member 11 for the leading blade, when the second driving member 12 for the leading blade is rotated in the clockwise direction.

The iron piece member 13 has a head portion 13b of a disk shape on one end of a shaft portion 13a, and an iron piece portion 13c attached to the other end. Moreover, the iron piece member 13 is biased, by the aforementioned compression spring, which is fitted onto the shaft portion 13a within the attaching portion 12a, so that the iron piece portion 13c will protrude from within the attaching portion 12a, but the state illustrated in FIG. 1 is maintained by the head portion 13b contacting the edge of the attaching portion 12a.

A driving member 14 for the trailing blade, which structure is a driving mechanism for the trailing blade and which is manufactured from a synthetic resin, is attached rotatably to the shaft 1e that protrudes from the surface side of the shutter bottom board 1.

The driving member 14 of the trailing blade has an attaching portion 14a and a driving pin 14b. The driving pin 14b that is formed on the back surface side is inserted into the elongated hole 1c of the shutter bottom board 1. Given this, the driving pin 14b has a cross section that is circular at the position on the blade root side, and the arced surface thereof is able to contact the shock absorbing member, not illustrated, that is attached to the bottom and portion of the elongated hole 1c. Moreover, the cross section at the position on the tip end side is shaped as an artillery shell, and is connected to the trailing blade within the blade chamber, as described below, where the tip-most end portion is inserted into elongated holes, not illustrated, that are shaped essentially identically to the elongated hole 1c, formed in the middle board 2 and the auxiliary bottom board 3. Note that the cross section of the driving pin 14b at the position of the blade root side may be a D shape instead. Moreover, the cross-sectional shape at the position of the tip end side of the driving pin 14b may be an oval shape instead.

Moreover, a roller 15, as a pushed portion, is attached to the shutter bottom board 1 side face of the driving member 14 for the trailing blade. Given this, the driving member 14 for the trailing blade is biased so as to be rotated in the clockwise direction (in the direction of the arrow C around the shaft 1e in FIG. 1) by the biasing force of a driving spring for the trailing blade, such as is a customary practice, not illustrated.

This attaching portion 14a for the driving member 14 for the trailing blade has, therein, an iron piece member 16 and a compression spring, not illustrated, are housed within the attaching portion 14a. Moreover, the iron piece member 16 has a head portion 16b of a disk shape on one end of a shaft portion 16a, and an iron piece portion 16c attached to the other end. Moreover, the iron piece member 16 is biased, by the aforementioned compression spring, which is fitted onto the shaft portion 16a within the attaching portion 14a, so that the iron piece portion 16c will protrude from within the attaching portion 14a, but the state illustrated in FIG. 1 is maintained by the head portion 16b contacting the edge of the attaching portion 14a.

A set member 17, manufactured from a synthetic resin, is attached rotatably to a shaft 1f that is protruding from the surface side of the shutter bottom board 1. Along with having a pushing portion 17a for pushing the pushed portion 12c of the second driving member 12 for the leading blade, a pushing portion 17b for pushing the roller 15 that is attached to the driving member 14 for the trailing blade, and a pushed portion 17c that is pushed by a member on the camera main unit side, not illustrated, in this set member 17 a thick portion is formed in essentially the entire region surrounding the shaft 1f on the surface on the shutter bottom board 1 side, and a thin portion is formed along the circumferential direction, centered on the shaft 1f, in a portion of the outer edge region, so as to avoid interfering with the second driving member 12 for the leading blade, which is set to the setting position. The pushing portion 17a is formed in the thin portion of the set member 17, and the pushing portion 17b and the pushed portion 17c are formed in the thick portion of the set member 17.

Moreover, the set member 17 is biased so as to rotate in the counterclockwise direction (the direction of the arrow E, centered on the shaft 1f, in FIG. 1) by a restoring spring, not illustrated. FIG. 1 shows the state wherein the pushed portion 17c is pushed by a member on the camera main unit side, not illustrated, to be rotated in the clockwise direction (the direction opposite of the direction of the arrow E, centered on the shaft 1f in FIG. 1) against the biasing force of the restoring spring, so the pushing portion 17a pushes the pushed portion 12c, and the pushing portion 17b pushes the roller 15, causing the second driving member 12 for the leading blade and the driving member 14 for the trailing blade to rotate in the counterclockwise direction against the biasing forces of the respective driving springs, not illustrated (that is, in the direction that is on the opposite side of the direction of the arrow A, centered on the shaft 1d in FIG. 1, and the direction that is opposite of the direction of the arrow C, centered on the shaft 1e), causing the driving pin 12b of the second driving member 12 of the leading blade to contact the shock absorbing member, not illustrated, that is attached to the top end portion of the elongated hole 1b, and causing the driving pin 14b of the driving member 14 for the trailing blade to stop at a position that is in contact with the top end portion of the elongated hole 1c. In the below, this position for the set member 17 will be termed the "set position."

In the present example, the set member 17 is manufactured as a single component through monolithic fabrication. Note that in consideration of the mass production of the set member 17, the position wherein the pushed portion 17c exists may, alone, be fabricated from metal, with the other parts fabricated from synthetic resin and then integrated together into a single component.

A switching mechanism 18 is attached to the surface side of the shutter bottom board 1. The switching mechanism 18 has a control lever portion 18a and an electromagnet 18b.

The control lever portion 18a has a control lever 18a-1, as a stopping member that is attached rotatably to the shaft 1g that protrudes from the surface side of the shutter bottom board 1, and a stopper 18a-2. The control lever 18a-1 has, on one end, an engaging portion 18a-11 that is able to lock the engagement portion 11c of the first driving member 11 for the leading blade and is able to lock the rotation, in the counterclockwise direction, of the first driving member 11 for the leading blade, through engaging with an engagement portion 11c, and a pushed portion 18a-12, which is formed to the outside of the engaging portion 18a-11, and has, on the other end, a permanent magnet 18a-13, as an operating portion. The pushed portion 18a-12 is formed so as to be pushed by the pushing portion 11d of the first driving member 11 for the leading blade where the first driving member 11 for the leading blade is rotated in the direction of opening the exposure opening by the second driving member 12 for the leading blade, in a state wherein the positioning is at a position wherein the engaging portion 18a-11 can lock the engagement portion 11c of the first driving member 11 for the leading blade. The permanent magnet 18a-13, when the electric current in the single direction is removed from the coil 18b-2, produces a magnetic force that acts as an attractive force in relation to the electromagnet 18b, and, when an electric current in the single direction is applied to the coil 18b-2, produces a magnetic force that acts as a repulsive force in relation to the electromagnet 18b. The stopper 18a-2 is provided on the surface side of the shutter bottom board 1, and stops, at a position away from the vicinity of the bottom end portion of the elongated hole 1b, so as to enable releasing of the lock of the engaging portion 11c by the engaging portion 18a-11, the control lever 18a-1 that is rotated in the direction of releasing the lock of the engagement portion 11c of the first driving member 11 for the leading blade by the engaging portion 18a-11 (the counterclockwise direction in the present example, that is, in the direction of the arrow F, centered on the shaft 1g, illustrated in FIG. 1) through contact by the control lever 18a-1.

The electromagnet 18b has a core member 18b-1 wherein the tip ends of each of two essentially U-shaped leg portions are magnetic pole portions, and a bobbin, which is wound with a coil 18b-2, fitted onto one of the leg portions of the core member 18b-1, and is screwed to the shutter bottom board 1. Given this, when an electric current is applied, in the single direction, to the coil 18b-2, the electromagnet 18b produces a magnetic force, which is repulsive in relation to the permanent magnet 18a-13, from the magnetic pole portion on the one leg portion tip end of the core member 18b-1, to rotate the control lever 18a-1 in the direction that unlocks the locking of the engagement portion 11c of the first driving member 11 for the leading blade by the engaging portion 18a-11 (that is, in the counterclockwise direction in the present example). Moreover, when the electric current, in the single direction, is removed from the coil 18b-2, the electromagnet 18b rotates the control lever 18a-1 in the direction wherein the engagement portion 11c of the first driving member 11 for the leading blade is locked by the engaging portion 18a-11, through the attractive force of the permanent magnet 18a-13 in relation to the electromagnet 18b (that is, the clockwise direction in the present example). FIG. 1 shows a state wherein the rotation of the control lever 18a-1 in the clockwise direction has been stopped by the attraction of the permanent magnet 18a-13 to the electromagnet 18b, positioned in the vicinity of the bottom end portion of the elongated hole 1b, wherein the engagement portion 11c of the first driving member 11 for the leading blade can be locked by the engaging portion 18a-11, in a state wherein the electric current in the single direction has been removed from the coil 18b-2.

The structure of the back face side of the shutter bottom board 1 will be explained next. The leading blade, which is disposed between the shutter bottom board 1 and the middle board 2, is structured from an arm 19 wherein one end is attached rotatably to the shaft 1h of the shutter bottom board 1, an arm 20 wherein one end is attached rotatably to the shaft 1j of the shutter bottom board 1, and three blades 21, 22, and 23 that are pivotally supported, sequentially, toward the other end portions, being the free end portions, thereof, where the blade 23 is a slit-formed blade of the leading blade. Given this, as is a customary practice, the tip end portion of the driving pin 11b of the first driving member 11 for the leading blade is fitted into an elongated hole, not illustrated, formed in the arm 19.

Moreover, a leading blade set spring, which is a torsion coil spring, not illustrated, is fitted onto the shaft 1j of the shutter bottom board 1, where one end thereof hooks onto a spring hooking portion, not illustrated, provided on the shutter bottom board 1, and the other end thereof hooks into a hole (with no code) of the arm 20, biasing the arm 20 so as to rotate in the counterclockwise direction (in the direction of the arrow B, centered on the shaft 1j in FIG. 1). Because of this, the setting spring for the leading blade biases the first driving member 11 for the leading blade, indirectly through the leading blade, so as to rotate in the counterclockwise direction. Note that the biasing force is weaker than the biasing force of the driving spring for the leading blade, set forth above, which biases the second driving member 12 of the leading blade so as to rotate in the clockwise direction.

Such a set spring for the leading blade need not be structured as in the present example, but, as is a customary practice, may be structured with one end, on the surface side of the shutter bottom board 1, hooked to the shutter bottom board 1, and the other end hooked to the first driving member 11 of the leading blade, or one end hooked to the second driving member 12 for the leading blade and the other end hooked to the first driving member 11 for the leading blade. Because of this, the present invention does not dismiss structuring in these ways. However, when structured as in the present example, there is the benefit of the set spring for the leading blade also acting in the role of a well-known backlash spring for the leading blade (that is, a spring that hooks the arm 20 so as to stabilize the orientation of the slit-formed blade at the position wherein the exposing operation starts, without play between the structural components of the leading blade).

On the other hand, the trailing blade, which is disposed between the middle board 2 and the auxiliary bottom board 3, is structured from an arm 24 wherein one end is attached rotatably to the shaft 1i of the shutter bottom board 1, an arm 25 wherein one end is attached rotatably to the shaft 1k of the shutter bottom board 1, and three blades 26, 27, and 28 that are pivotally supported, sequentially, toward the other end portions, being the free end portions, thereof, where the blade 28 is a slit-formed blade of the trailing blade. Given this, as is a customary practice, the tip end portion of the driving pin 14b of the driving member 14 for the trailing blade is fitted into an elongated hole, not illustrated, formed in the arm 24.

Moreover, a trailing blade set spring, which is a torsion coil spring, not illustrated, is fitted onto the shaft 1k of the shutter bottom board 1, where one end thereof hooks onto a spring hooking portion, not illustrated, of the shutter bottom board 1, and the other end thereof hooks into a hole (with no code) of the arm 25, biasing the arm 25 so as to rotate in the counterclockwise direction (in the direction of the arrow D, centered on the shaft 1k in FIG. 1). Because of this, although the set spring or the trailing blade is biased so as to rotate the driving member 14 for the trailing blade, indirectly through the trailing blade, in the counterclockwise direction, that biasing force is not as strong as the biasing force of the driving spring for the trailing blade, not shown, as described above, that is connected to the driving member 14 for the trailing blade. Given this, even with a set spring for the trailing blade, this can also perform the role as a backlash spring for the trailing blade, as is the customary practice (a spring that engages the arm 25 for causing the orientation of the slit-formed blade of the trailing blade to be uniform in the starting position for the exposing operation), although instead the structure may be one that directly engages the driving member 14 for the trailing blade. Note that, for convenience, arrow A through F are illustrated in FIG. 1 only.

The operation of the focal plane shutter for a camera according to the Example will be explained next using FIG. 1, which was used in the explanation of the structure, above, and using FIG. 2 through FIG. 7. Note that the focal plane shutter for a camera according to the Example enables imaging through selecting, prior to imaging, imaging through a normally open system or imaging through a normally closed system, through operating mode selecting means, not illustrated, provided in the camera. Because of this, in the explanation of the operation in the present example, the explanation will be for the operation in a normally open system, followed by the imaging operation for performing the exposing operation, using the leading blade and the trailing blade, in a normally closed system.

As already explained, FIG. 1 shows a state wherein, when capturing an image in the normally open system, after the setting operations have been completed, the release button is pressed, a control lever 18a-1 moves out of the travel path for the engagement portion of the first driving member for the leading blade, the lock with the first driving member of the leading blade is unlocked, and the leading blade returns to the position that covers the exposure opening, after which the control lever 18a-1 has moved into the travel path of the engagement portion of the first driving member of the leading blade. At this time, in the second driving member 12 for the leading blade, the pushed portion 12c is pushed by the pushing portion 17a of the set member 17, to be rotated in the counterclockwise direction against the biasing force of the driving spring for the leading blade, as is the common practice, and the first driving member 11 for the leading blade is rotated in the counterclockwise direction by the biasing force of the set spring for the leading blade, not illustrated, to be held in this stopped state by the driving pin 11b being put into contact with a shock absorbing member, not illustrated, that is attached to the top end portion of the elongated hole 1b. Given this, at this time, the three blades 21-23 of the leading blade go into a deployed state, covering the opening portion 1a. Furthermore, the pushed portion 11a of the first driving member 11 for the leading blade contacts the pushing portion 12b of the second driving member 12 for the leading blade.

On the other hand, in the driving member 14 for the trailing blade, the roller 15 is pushed by the pushing portion 17b of the set member 17, and is rotated in the counterclockwise direction against the biasing force of the driving spring for the trailing blade, not illustrated, as is the customary practice, so the driving pin 14b of the driving member 14 for the trailing blade contacting the top end portion of the elongated hole 1c causes this stopped state to be maintained. At this time, the three blades 26-28 of the trailing blade go into an overlapping state, retracted from over the opening portion 1a.

Moreover, the electromagnet 18b goes into a state wherein the electric current, in the single direction, is removed from the coil 18b-2 (an OFF state), so no magnetic force that is repulsive in relation to the permanent magnet 18a-13 is produced. Because of this, the control lever 18a-1 is rotated in the clockwise direction through the attractive force of the permanent magnet 18a-13 in relation to the core member 18b-1, and the permanent magnet 18a-13 is stopped through attractively holding the core member 18b-1, with the engaging portion 18a-11 positioned in the vicinity of the bottom end portion of the elongated hole 1b wherein the first driving member 11 of the leading blade can lock the engagement portion 11c.

After the state illustrated in FIG. 1, the electromagnet 6 for the leading blade and the electromagnet 7 for the trailing blade go into an excited state, so the iron pieces 13 and 16 attractively hold the core members 6a and 7a. Following this, the member on the camera main unit side, not illustrated, removes the pushing force from the pushed portion 17c of the set member 17. As a result, the set member 17 rotates in the counterclockwise direction, due to the biasing force of the restoring spring, not illustrated, to return to the position illustrated in FIG. 2 (where this position shall be termed the "initial position"). In the initial stage of this returning action, in the set member 17 the pushing portion 17a moves away from the pushed portion 12c of the second driving member 12 for the leading blade, and the pushing portion 17b moves away from the roller 15 that is attached to the driving member 14 of the trailing blade, and thus the second driving member 12 for the leading blade and the driving member 14 for the trailing blade are rotated in the clockwise direction by the biasing forces of the driving spring for the leading blade and the driving spring for the trailing blade, not illustrated; however because the iron pieces 13 and 16 are attractively held to the core members 6a and 7a, at the point wherein there has been a slight rotation, the attaching portions 12a and 14a thereof are stopped by contacting the head portions 13b and 16b of the iron piece members 13 and 16.

Given the slight rotation of the second driving member 12 for the leading blade in this way, in the first driving member 11 for the leading blade, the pushed portion 11a thereof is pushed by the pushing portion 12b of the second driving member 12 for the leading blade, to rotate slightly against the biasing force of the set spring for the leading blade, not illustrated, and thus the three blades 21-23 of the leading blade are also moved slightly downward; however, they are stopped prior to starting opening the opening portion 1a. Moreover, the three blades 26-28 of the trailing blade are also moved slightly downward through the slight rotation against the biasing force of the set spring for the trailing blade, not illustrated, through the slight rotation of the driving member 14 of the trailing blade, but are stopped prior to starting to cover the opening portion 1a. For the first driving member 11 for the leading blade, the second driving member 12 for the leading blade, the driving member 14 for the trailing blade, and the trailing blade, the positions assumed in this way are the starting positions for the exposing operation.

Figure 3:
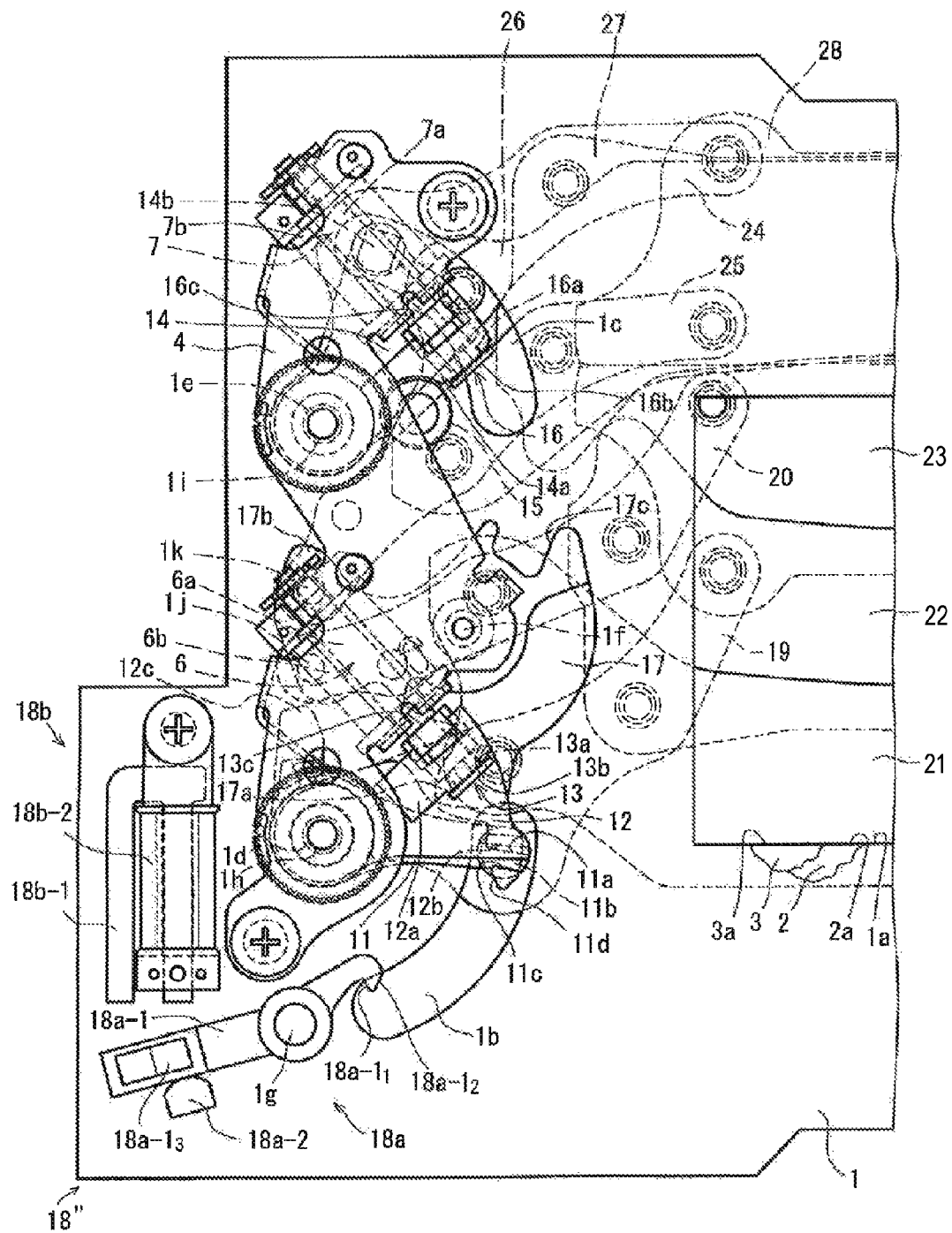
FIG. 3 is a plan view diagram illustrating a state immediately previous to an exposing operation, wherein, from the state in FIG. 2, the control lever has moved to outside of the travel path of the engagement portion of the first driving member for the leading blade.

The position wherein the set member 17 has returned to the initial position from the set position is essentially the same as at the start, where the electromagnet 18b is supplied an electric current, in the single direction, in the coil 18b-2, so produces a magnetic force that is repulsive in relation to the permanent magnet 18a-13, causing the control lever 18a-1 to rotate in the counterclockwise direction, causing the control lever 18a-1 to contact the stopper 18a-2. As a result, the engaging portion 18a-11 retracts to a position away from the vicinity of the bottom end portion of the elongated hole 1b, enabling releasing of the lock of the engagement portion 11c of the first driving member 11 of the leading blade. The state at this time is illustrated in FIG. 3.

The engaging portion 18a-11, after being caused to retract to a position other than the vicinity of the bottom end portion of the elongated hole 1b, enabling releasing of the lock of the engagement portion 11c of the first driving member 11 of the leading blade, the electromagnet 6 for the leading blade and the electromagnet 7 of the trailing blade are sequentially demagnetized for prescribed time intervals depending on the brightness of the photographic subject light. When the electromagnet 6 for the leading blade is demagnetized, the attractive force of the core member 6a in relation to the iron piece member 13 is extinguished causing the second driving member 12 for the leading blade to be rotated quickly in the clockwise direction by the biasing force of the driving spring for the leading blade, not illustrated. At this time, in the second driving member 12 for the leading blade, the pushing portion 12b pushes the pushed portion 11a of the first driving member 11 for the leading blade, causing the first driving member 11 of the leading blade to rotate in the clockwise direction against the biasing force of the set spring for the leading blade, not illustrated, and thus the three blades 21-23 of the leading blade each move downward, each greatly overlapping the adjacent blade, to open the opening portion 1a with the top and edge of the slit-formed blade 23. Given this, the driving pin 11b of the first driving member 11 for the leading blade contacting the shock absorbing member, not illustrated, that is attached to the bottom end portion of the elongated hole 1b stops the action of the two driving members 11 and 12 for the leading blade and the action of the leading blade.

At a prescribed time interval after the demagnetization of the electromagnet 6 for the leading blade, the electromagnet 7 for the trailing blade is demagnetized. At this time, the attractive force of the core member 7a in relation to the iron piece member 16 is extinguished, so the driving member 14 of the trailing blade is caused to rotate rapidly in the clockwise direction against the biasing force of the set spring for the trailing blade, not illustrated, by the biasing force of the driving spring for the trailing blade, not illustrated. Because of this, the three blades 26-28 of the trailing blade move downward, each greatly overlapping the adjacent blades, to close the opening portion 1a with the top end edge of the slit-formed blade 28. Given this, the driving pin 14b of the driving member 14 for the trailing blade contacting the shock absorbing member, not illustrated, that is attached to the bottom end portion of the elongated hole 1c stops the action of the driving member 14 for the trailing blade and the action of the trailing blade. The exposing operation is completed thereby.

Figure 4:
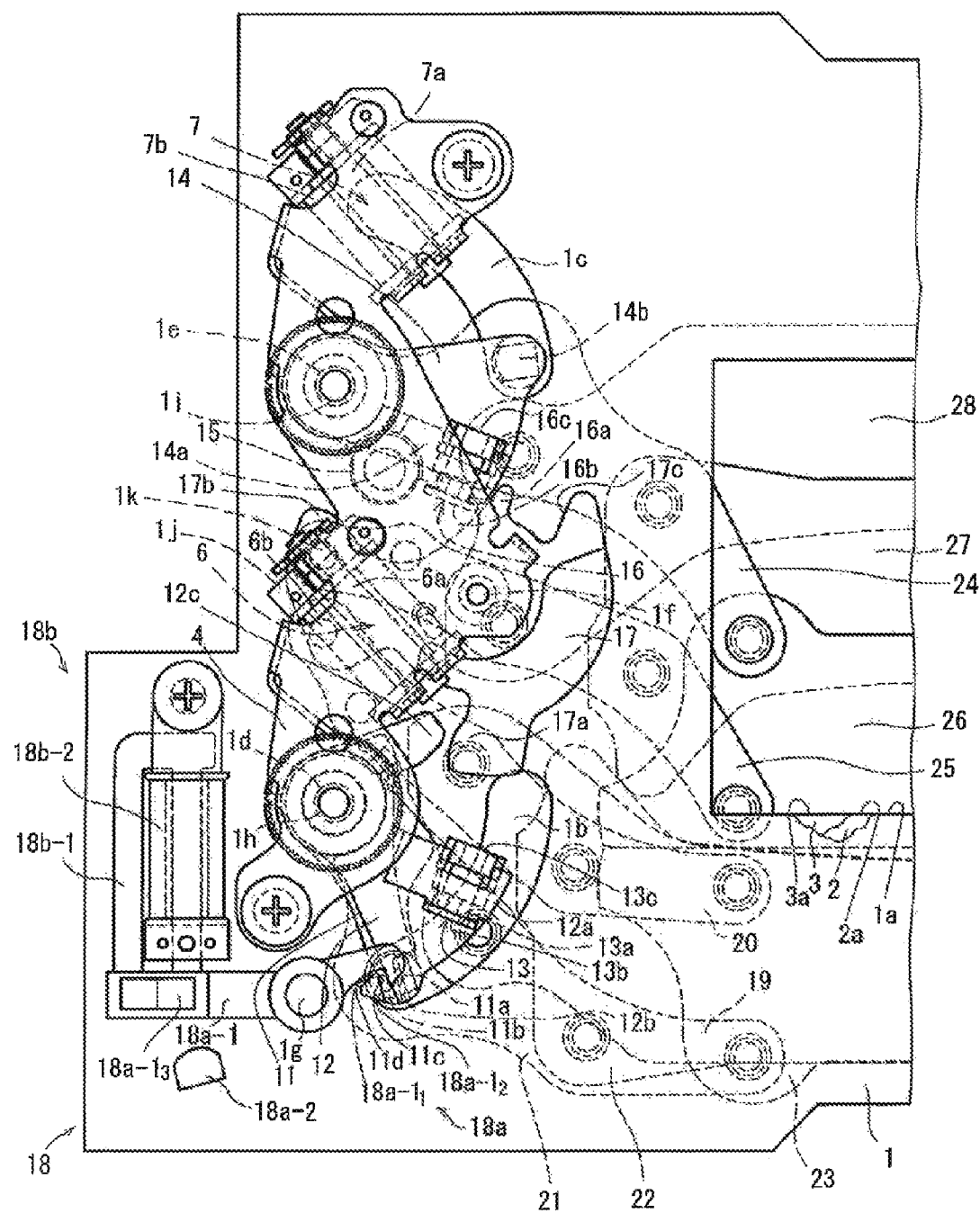
FIG. 4 is a plan view diagram illustrating a state wherein, after the leading blade and the trailing blade have traveled sequentially to complete the exposing operation, the control lever has moved into the travel path for the engagement portion of the first driving member for the leading blade, enabling locking of the first driving member for the leading blade, from the state in FIG. 3.

When the exposing operation is in the completed state, then the image information is immediately transferred from the imaging element to a string device through an information processing circuit. After a time interval that enables the transfer of the image information has elapsed, then the electric current, in the single direction, is removed from the coil 18b-2, causing the electromagnet 18b to cease to produce the magnetic force that is repulsive in relation to the permanent magnet 18a-13. As a result, the control lever 18a-1 is rotated in the clockwise direction by the attractive force of the permanent magnet 18a-13 to the core member 18b-1, and is stopped by the permanent magnet 18a-13 being attractively held by the core member 18b-1. At this time, the engaging portion 18a-11 is positioned in the vicinity of the bottom end portion of the elongated hole 1b, enabling the locking of the engagement portion 11c of the first driving member 11 for the leading blade. The state at this time is illustrated in FIG. 4.

Thereafter, the set member 17 begins immediately to rotate in the clockwise direction, with the pushed portion 17c pushed by the member on the camera main unit side, not illustrated. When this occurs, the pushing portion 17a of the set member 17 pushes the pushed portion 12c of the second driving member 12 for the leading blade, and the second driving member 12 for the leading blade begins to be rotated in the counterclockwise direction against the biasing force of the driving spring for the leading blade, not illustrated. At this time, a force that would cause rotation in the counterclockwise direction is applied, through the leading blade, by a set spring, not illustrated, to the first driving member 11 of the leading blade, but the engagement portion 11c of the first driving member 11 for the leading blade contacting the engaging portion 18a-11 of the control lever 18a-1 that is at the position illustrated in FIG. 4 prevents rotation in the counterclockwise direction. Because of this, only the second driving member 12 for the leading blade continues to rotate in the counterclockwise direction, with the three blades 21-23 of the leading blade in a state wherein they remain retracted from the opening portion 1a.

Essentially identically to the time when the pushing portion 17a of the set member 17 pushes the pushed portion 12c of the second driving member 12 for the leading blade, the other pushing portion 17b of the set member 17 pushes the roller 15 that is attached to the driving member 14 for the trailing blade, causing the driving member 14 for the trailing blade to begin to rotate in the counterclockwise direction against the biasing force of the driving spring for the trailing blade, not illustrated.

Thereafter as well, the set member 17 continues to rotate in the clockwise direction, so in the driving member 14 for the trailing blade, the roller 15 is pushed by the pushing portion 17b, and is rotated in the counterclockwise direction against the biasing force of the driving spring for the trailing blade, not illustrated. Because of this, the three blades 26-28 of the trailing blade move upward while greatly overlapping the adjacent blades, and the bottom and edge of the slit-formed blade 28 opens the opening portion 1a. Given this, the driving pin 14b of the driving member 14 for the trailing blade contacting the top end portion of the elongated hole 1c stops the rotation of the driving member 14 for the trailing blade in the counterclockwise direction. This causes the image frame to go into the open state.

Figure 5:
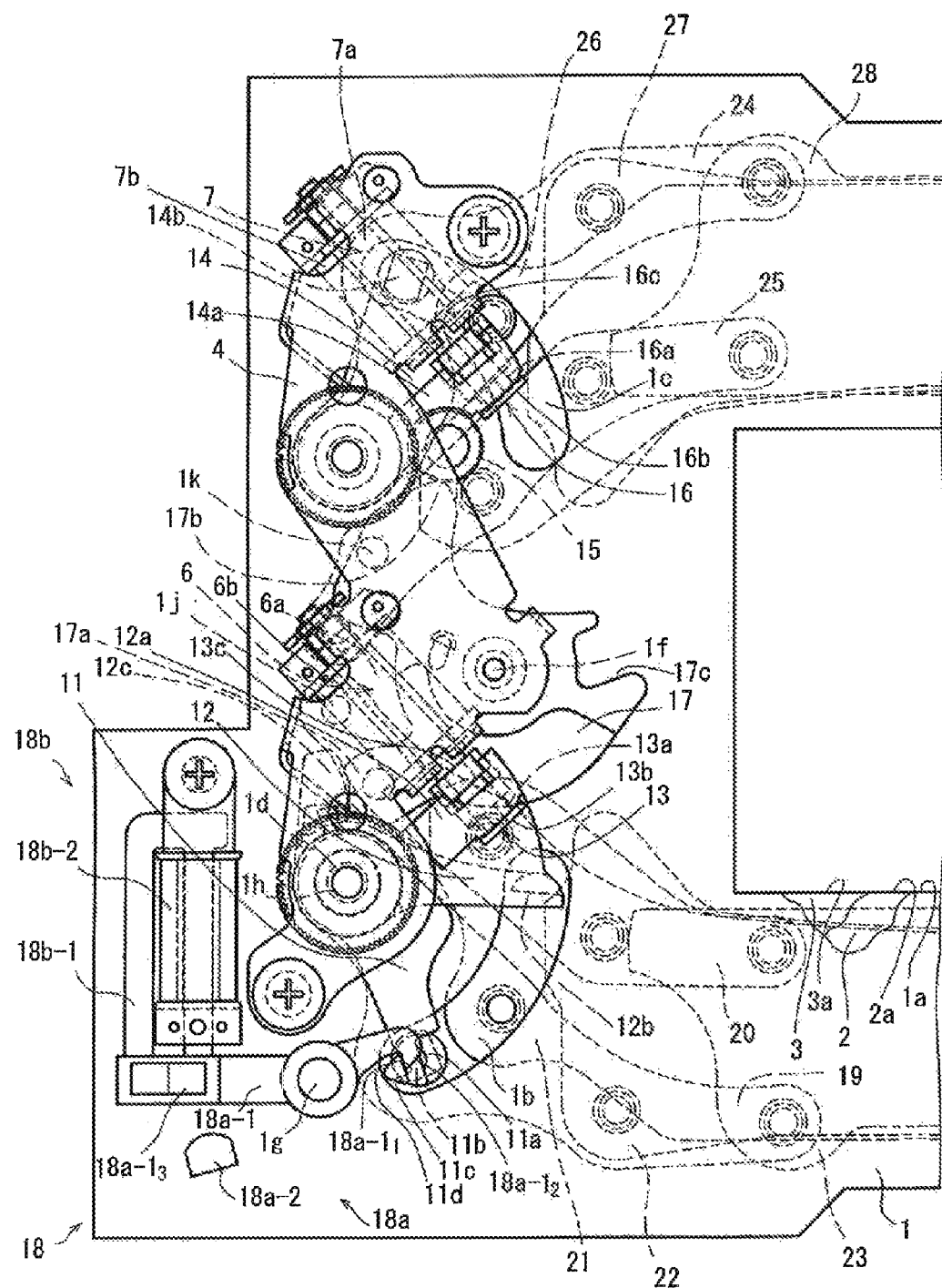
FIG. 5 is a plan view diagram illustrating a state wherein a setting operation has been performed from the state in FIG. 4, in a state wherein the image frame has been opened immediately prior to the completion of the setting operation.

Moreover, the iron piece portions 13c and 16c of the iron piece members 13 and 16, which are attached to the second driving member 12 for the leading blade in the driving member 14 for the trailing blade, move respectively forward and backward to contact the magnetic pole portions of the core members 6a and 7a of the electromagnet 6 for the leading edge and the electromagnet 7 for the trailing edge. FIG. 5 illustrates the state wherein the image frame has gone into the open state.

Thereafter as well, the set member 17 is stopped in a slightly rotated state, and in this process, the iron piece portions 13c and 16c of the iron piece members 13 and 16 are pushed in, into the attaching portions 12a and 14a, against the biasing forces of compression springs, not illustrated, to expose, on the opposite sides, portions of the shaft portions 13a and 16a, in a state wherein the head portions 13b and 16b are away from the attaching portions 12a and 14a.

Given this, when the set member 17 is stopped in this set position, the opening portion 1a will be fully open. This state is the state wherein the setting operation is complete, that is, a standby state awaiting the next imaging operation, where the set member 17 is held in this state, by the member on the camera main unit side, against the biasing force of the restoring spring, not illustrated, until carrying out the next imaging operation. Consequently, in this state the opening portion 1a is fully open, and thus, insofar as the power supply to the camera is not turned OFF, the image of the photographic subject can be observed in the electronic finder.

Note that the present example was structured as a direct focal plane shutter, but even when structured as a engagement-type focal plane shutter, after the setting operation has been completed the set member 17 is not return immediately to the initial position, but rather, it is necessary to hold in the set position, in the same manner as in the case of the present example. This is because if the set member 17 were returned to the initial position then the action of the three blades 21-23 of the leading blade would be initiated, causing the opening portion 1a to be covered, making it impossible to observe an image of the photographic subject in the electronic finder prior to the next imaging operation.

Figure 6:
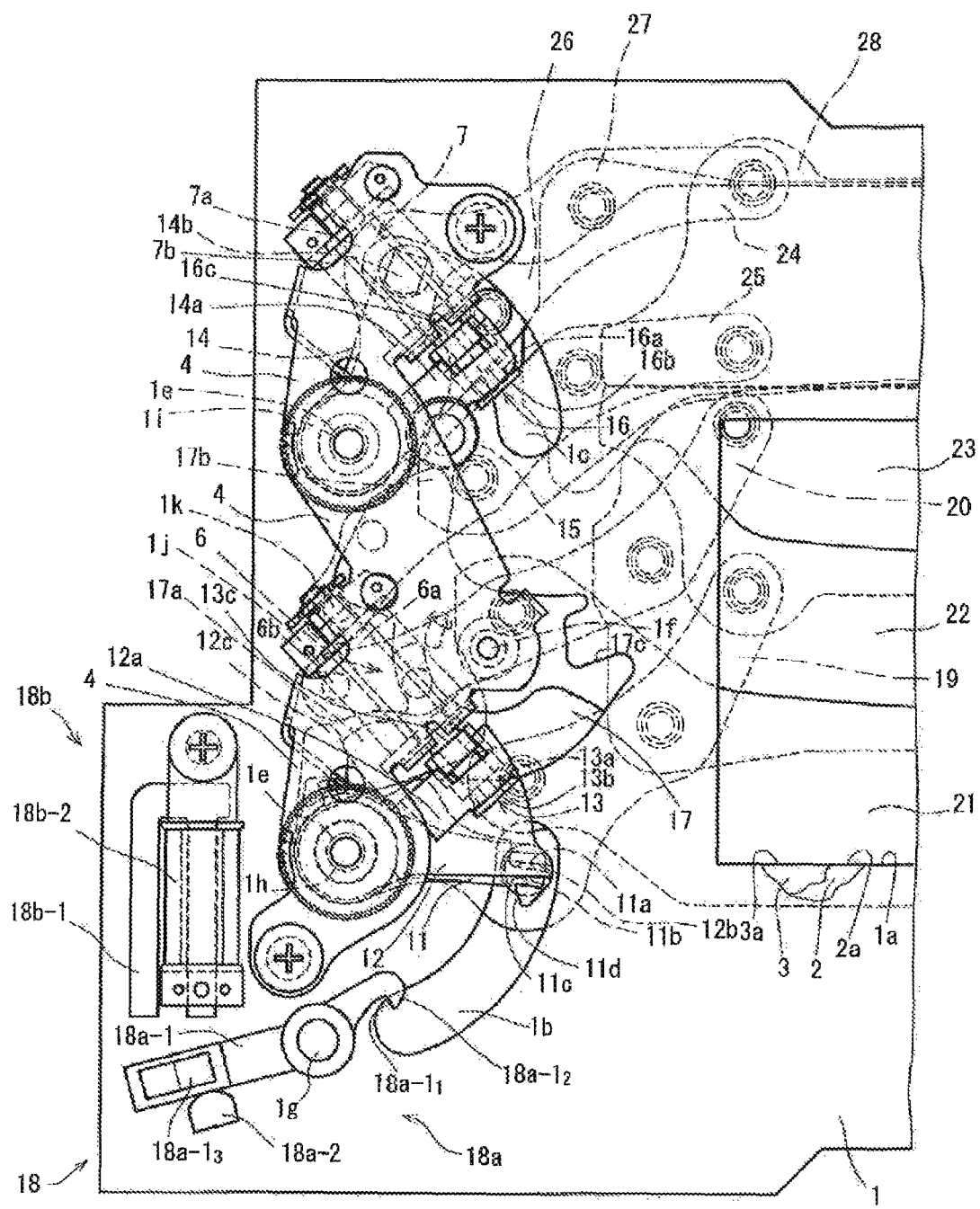
FIG. 6 is a plan view diagram illustrating a state wherein, in the state wherein the setting operation has been completed through the state in FIG. 5, a release button has been pressed, the control lever has moved to outside of the travel path of the engagement portion of the first driving member of the leading blade, the lock of the first driving member for the leading blade has been released, and the leading blade has returned to a position covering the exposure opening.

The case wherein the subsequent imaging operation is performed after the completion of the setting operation in this way will be explained next. In the state wherein the setting operation has been completed through passing through the state illustrated in FIG. 5, the release button on the camera is pressed while an image of the photographic subject is observed in the electronic finder. When this is done, then prior to the beginning of the actual imaging (the exposing operation), an electric current in the single direction is applied to the coil 18b-2, so the electromagnet 18b produces a magnetic force that is repulsive in relation to the permanent magnet 18a-13, causing the control lever 18a-1 to rotate in the counterclockwise direction, causing the control lever 18a-1 to contact the stopper 18a-2. As a result, the engaging portion 18a-11 is caused to retract to a position away from the vicinity of the bottom end portion of the elongated hole 1b, releasing the lock of the engagement portion 11c of the first driving member 11 for the leading blade. Following this, the first driving member 11 for the leading blade, for which the lock for the engagement portion 11c has been released, is rotated in the counterclockwise direction through the biasing force of a set spring for the leading blade, not illustrated. As a result, the three blades 21-23 of the leading blade are moved upward, to return to a position that covers the opening portion 1*a*. The state at this time is illustrated in FIG. 6. Given this, the driving pin 11*b* of the first driving member 11 for the leading blade contacting the shock absorbing member, not illustrated, that is attached to the top end portion of the elongated hole 1*b* stops the action of the first driving member 11 for the leading blade and the action of the leading blade.

Thereafter, the electric current, in the single direction, is removed from the coil 18*b*-2, causing the electromagnet 18*b* to cease to produce the magnetic force that is repulsive in relation to the permanent magnet 18*a*-13. As a result, the control lever 18*a*-1 is rotated in the clockwise direction by the attractive force of the permanent magnet 18*a*-13 to the core member 18*b*-1, and is stopped by the permanent magnet 18*a*-13 being attractively held by the core member 18*b*-1. At this time, the engaging portion 18*a*-11 is positioned in the vicinity of the bottom end portion of the elongated hole 1*b*, enabling the locking of the engagement portion 11*c* of the first driving member for the leading blade. The state at this time is illustrated in FIG. 1.

Given the focal plane shutter for a camera according to the Example, the switching mechanism 18 comprises: an electromagnet 18*b* to which an electric current is applied in only a single direction; and a stopping member having an operating portion wherein the direction of force, in relation to the electromagnet 18*b*, is switched in accordance with the switching between the electric current, in the single direction, being applied to the electromagnet 18*b* or removed from the electromagnet 18*b*, made from a control lever 18*a*-1 that is moved to a position wherein the lock of the engaging portion 18*a*-11 with the engagement portion 11*c* can be released when the electric current is applied, and moved to a position wherein the engaging portion 18*a*-11 can be locked to the engagement portion 11*c* when the electric current in the single direction is removed; wherein, depending on whether the engagement portion 11*c* is locked by the engaging portion 18*a*-11, or on whether this locking is released, after an exposing operation and prior to standing by, the rotation of the leading blade, relative to the first driving member 11 of the leading blade in the direction so as to close the exposure opening is switched between stopped and the stop being released, thus enabling a reduction in cost in the switching mechanism relative to a structure that uses a permanent magnet 18*a*-13 rotor and a solenoid, as in the JP '986 and the JP '060. Moreover, the flexibility of configuration is not limited as it is with a permanent magnet rotor. Furthermore, because the direction in which the electric current is applied to the electromagnet in order to carry out switching between locking the control lever 18*a*-1 to the engagement portion 11*c* through the engaging portion 18*a*-11, or releasing this lock, is only a single direction, the application of the electric current is controlled so as to remove the electric current in that single direction when locking the control lever 18*a*-1 to the engagement portion 11*c* through the engaging portion 18*a*-11 and applying the electric current in that single direction when releasing the lock, thus making it possible to reduce the time over which the current is applied, reducing electric power consumption.

Moreover, in the focal plane shutter for a camera according to the Example, the control lever 18*a*-1 is able to rotate centered on the shaft 1*g*, and has an engaging portion 18*a*-11 on one end and is provided with a first permanent magnet 18*a*-13 on the other end, where the operating portion is made from the first permanent magnet 18*a*-13, where the electromagnet 18*b* has a repulsive force in relation to the first permanent magnet 18*a*-13 when the electric current is applied in the single direction to the electromagnet 18*b*, so the control lever 18*a*-1 is rotated, through the repelling force of the first permanent magnet 18*a*-13 in relation to the electromagnet, in the direction wherein the lock of the engaging portion 18*a*-11 to the engagement portion 11*c* is released, and when the electric current to the electromagnet 18*b* is removed, the control lever 18*a*-1 is rotated, by the attractive force of the first permanent magnet 18*a*-13 in relation to the electromagnet 18*b*, to a direction wherein the engaging portion 18*a*-11 locks the engagement portion 11*c*, thus making it possible to reduce the member of components in the switching mechanism.

Figure 7:
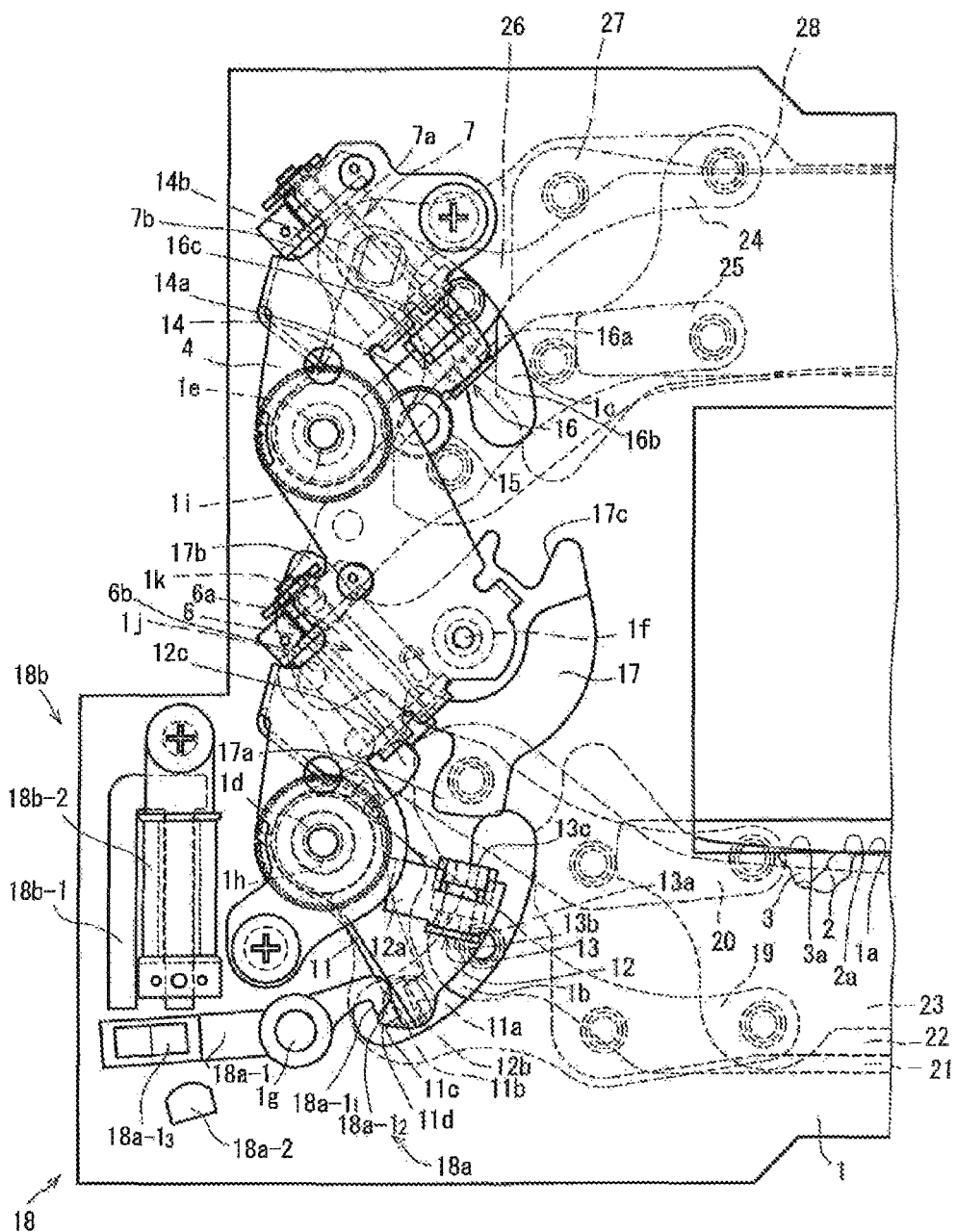
FIG. 7 is a diagram illustrating a modified example of an operation in imaging using the normally open system in a focal plane shutter for a camera according to the Example, a diagram illustrating a state wherein the exposing operation is just beginning, without the control lever moving to the outside of the travel path of the engagement portion of the first driving member for the leading blade from the state in FIG. 2, a plan view diagram illustrating a state when the first driving member for the leading blade is stopped, immediately previous to the completion of the exposing operation.

FIG. 7 is a diagram illustrating a modified example of the operation in imaging using a normally open system in a focal plane shutter for a camera according to the Example. In this modified example, the exposing operation is started without moving the control lever 18*a*-1 outside of the travel path of the engagement portion 11*c* of the first driving member 11 for the leading blade from the state illustrated in FIG. 2. Specifically, the electromagnet 6 for the leading blade and the electromagnet 7 for the trailing blade are demagnetized sequentially, after a prescribed time interval that depends on the brightness of the light from the photographic subject, in a state wherein the control lever 18*a*-1 is still positioned in the vicinity of the bottom end portion of the elongated hole 1*b* wherein the engagement portion 11*c* of the first driving member 11 for the leading blade can be locked. When the electromagnet 6 for the leading blade is demagnetized, the attractive force of the core member 6*a* in relation to the iron piece member 13 is extinguished causing the second driving member 12 for the leading blade to be rotated quickly in the clockwise direction by the biasing force of the driving spring for the leading blade, not illustrated. At this time, in the second driving member 12 for the leading blade, the pushing portion 12*b* pushes the pushed portion 11*a* of the first driving member 11 for the leading blade, causing the first driving member 11 of the leading blade to rotate in the clockwise direction against the biasing force of the set spring for the leading blade, not illustrated, and thus the three blades 21-23 of the leading blade each move downward, each greatly overlapping the adjacent blade, to open the opening portion 1*a* with the top and edge of the slit-formed blade 23. Additionally, prior to the driving pin 11*b* of the first driving member 11 for the leading blade contacting the shock absorbing member, not illustrated, that is attached at the bottom end portion of the elongated hole 1*b*, the pushing portion 11*d* makes sliding contact with the pushed portion 18*a*-12 of the control lever 18*a*-1, pushing the pushed portion 18*a*-12, so the control lever 18*a*-1 is rotated in the counterclockwise direction against the attractive force of the permanent magnet 18*a*-13 in relation to the electromagnet 18*b*. As a result, the first driving member 11 of the leading blade is stopped. FIG. 7 illustrates the state wherein the first driving member 11 for the leading blade is stopped in this way.

Thereafter, the first driving member 11 for the leading blade, which is pushed by the second driving member 12 for the leading blade, while stopped in its movement by the pushing portion 11*d* pushing the pushed portion 18*a*-12 of the control lever 18*a*-1, the control lever 18*a*-1 is rotated in the counterclockwise direction, against the attractive force of the permanent magnet 18*a*-13 in relation to the electromagnet 18*b*. At this time, the pushed portion 18*a*-12 of the control lever 18*a*-1 is retracted to outside of the travel path of the engagement portion 11*c* of the first driving member 11 for the leading blade, but the attractive force of the permanent magnet 18a-13 in relation to the core member 18b-1 is maintained.

Given this, when the driving pin 11b reaches the position wherein it contacts the shock absorbing member, not illustrated that is attached to the bottom end portion of the elongated hole 1b, the pushed portion 18a-12 of the control lever 18a-1 will be in a state wherein it is not pushed, away from the pushing portion 11d. Because of this, the control lever 18a-1 is rotated in the clockwise direction by the attractive force of the permanent magnet 18a-13 in relation to the core member 18b-1, so the engaging portion 18a-11 locks the engagement portion 11c. Through this, not only will the bound of the first driving member 11 for the leading blade caused to be stationary, but the rotation of the leading blade, by the first driving member 11 for the leading blade, in the direction of closing the exposure opening will be prevented.

At a prescribed time interval after the demagnetization of the electromagnet 6 for the leading blade, the electromagnet 7 for the trailing blade is demagnetized. The operation of the driving member 14 for the trailing blade, and of the trailing blade, from after the demagnetization of the electromagnet 7 for the trailing blade until the state wherein the exposing operation has been completed is essentially identical to the case wherein the exposing operation is started in the state in FIG. 3, wherein the control lever 18a-1 is moved from the state illustrated in FIG. 2 to outside of the travel path of the engagement portion 11c of the first driving member 11 for the leading blade.

Figure 2:
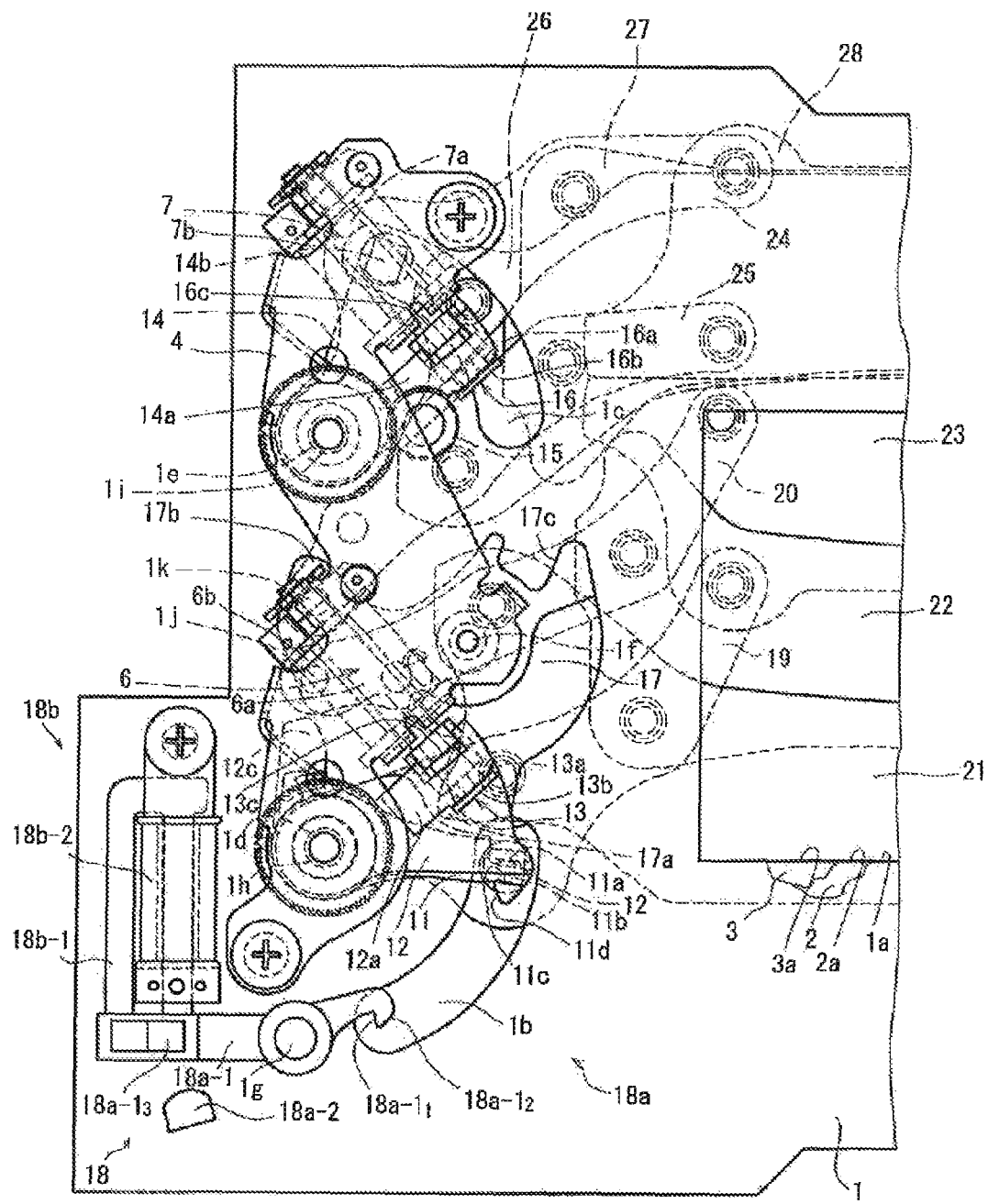
FIG. 2 is a plan view diagram illustrating a state wherein the set member has returned to the initial position from the state in FIG. 1.

Consequently, in the modified example of the Example, from the state in FIG. 2 wherein the set member 17 has returned to the initial position, until the end of the exposing operation, the engaging portion 18a-11 can be locked to the engagement portion 11c of the first driving member 11 for the leading blade through the attractive force of the permanent magnet 18a-13 in relation to the core member 18b-1, without applying the electric current in the single direction to the coil 18b-2, and without removing the electric current therefrom. Because of this, the frequency with which the electric current is applied in the single direction to the electromagnet 18b, and with which this electric current is removed, in order to lock the engagement portion 11c of the first driving member 11 of the leading blade, using the control lever 18a-1, is reduced to only when the camera release button has been pressed after the setting operation has been completed, to return the first driving member 11 of the leading blade to the set position, making it possible to shorten the time over which the electric current is applied, to thereby enable saving of electric power to that extent. Furthermore, the boundary for the first driving member 11 for the leading blade can be suppressed by controlling the motion of the first driving member 11 for the leading blade, through causing a sliding contact and pushing operation of the pushing portion 11d on the pushed portion 18a-12 of the control lever 18a-1. Because of this, the time from the completion of an exposing operation until the subsequent setting operation, when in continuous photographing mode, can be shortened even further, enabling an improvement in the continuous photographing speed.

The operation in imaging using a normally closed system in a focal plane shutter for a camera according to the Example will be explained next. Imaging in the normally closed system is a case where imaging is performed using an optical finder where, in the case of a camera that is provided with a movable mirror, not illustrated, the movable mirror is in a down state, enabling the photographic subject image to be observed using the optical finder. Moreover, the current is supplied constantly in the single direction to the coil 18b-2, so the electromagnet 18b produces a magnetic force that is repulsive in relation to the permanent magnet 18b-13, so the control lever 18a-1 contacts the stopper 18a-2, so as to maintain a state wherein it is positioned away from the vicinity of the bottom end portion of the elongated hole 1b, so that the engaging portion 18a-11 can release the lock of the engagement portion 11c of the first driving member 11 of the leading blade.

When the operations from the completion of the exposing operation until the beginning of the next exposing operation are explained sequentially, from the state wherein the exposing operation has been completed, when a time interval for transferring the image information has elapsed, in the set member 17, the pushed portion 17c is pushed by a member on the camera main unit side, not illustrated, and begins to rotate in the clockwise direction, so the pushing portion 17a of the set member 17 pushes the pushed portion 12c of the second driving member 12 for the leading blade, starting the second driving member 12 for the leading blade to rotate in the counterclockwise direction against the biasing force of a driving spring for the leading blade, not illustrated. At this time, the first driving member 11 of the leading blade is caused to rotate in the counterclockwise direction following the second driving member 12 for the leading blade, while the pushed portion 11a is in contact with the pushing portion of the second driving member 12 of the leading blade, through the biasing force of the set spring, not shown. Because of this, the three blades 21-23 of the leading blade go into a deployed state, covering the opening portion 1a. Given this, the driving pin 11b of the driving member 11 for the leading blade contacting the shock absorbing member, not illustrated, that is attached to the bottom end portion of the elongated hole 1b stops the rotation of the driving member 11 for the leading blade in the counterclockwise direction.

Essentially identically to the time when the pushing portion 17a of the set member 17 pushes the pushed portion 12c of the second driving member 12 for the leading blade, the other pushing portion 17b of the set member 17 pushes the roller 15 that is attached to the driving member 14 for the trailing blade, causing the driving member 14 for the trailing blade to begin to rotate in the counterclockwise direction against the biasing force of the driving spring for the trailing blade, not illustrated.

Thereafter as well, the set member 17 continues to rotate in the clockwise direction, so in the driving member 14 for the trailing blade, the roller 15 is pushed by the pushing portion 17b, and is rotated in the counterclockwise direction against the biasing force of the driving spring for the trailing blade, not illustrated. Because of this, the three blades 26-28 of the trailing blade move upward while greatly overlapping the adjacent blades, and the bottom and edge of the slit-formed blade 28 opens the opening portion 1a. Given this, the driving pin 14b of the driving member 14 for the trailing blade contacting the top end portion of the elongated hole 1c stops the rotation of the driving member 14 for the trailing blade in the counterclockwise direction. In a normally closed system, the setting operation is complete when this state has been achieved.

The case wherein the subsequent imaging operation is performed after the completion of the setting operation in this way will be explained next. The release button of the camera is pressed while the photographic subject is observed using the optical finder. At this time, the electromagnet 6 for the leading blade and the electromagnet 7 for the trailing blade go into an excited state, so the iron piece members 13 and 16 attractively hold the core members 6a and 7a. Following this, the member on the camera main unit side, not illustrated, removes the pushing force from the pushed portion 17c of the set member 17. As a result, the set member 17 rotates in the counterclockwise direction, due to the biasing force of the restoring spring, not illustrated, to return to the position illustrated in FIG. 3 (where this position shall be termed the "initial position"). In the initial stage of this returning action, in the set member 17 the pushing portion 17a moves away from the pushed portion 12c of the second driving member 12 for the leading blade, and the pushing portion 17b moves away from the roller 15 that is attached to the driving member 14 of the trailing blade, and thus the second driving member 12 for the leading blade and the driving member 14 for the trailing blade are rotated in the clockwise direction by the biasing forces of the driving spring for the leading blade and the driving spring for the trailing blade, not illustrated; however because the iron piece members 13 and 16 are attractively held to the core members 6a and 7a, at the point wherein there has been a slight rotation, the attaching portions 12a and 14a thereof are stopped by contacting the head portions 13b and 16b of the iron piece members 13 and 16.

Given the slight rotation of the second driving member 12 for the leading blade in this way, in the first driving member 11 for the leading blade, the pushed portion 11a thereof is pushed by the pushing portion 12b of the second driving member 12 for the leading blade, to rotate slightly against the biasing force of the set spring for the leading blade, not illustrated, and thus the three blades 21-23 of the leading blade are also moved slightly downward; however, they are stopped prior to starting opening the opening portion 1a. Moreover, the three blades 26-28 of the trailing blade are also moved slightly downward through the slight rotation against the biasing force of the set spring for the trailing blade, not illustrated, through the slight rotation of the driving member 14 of the trailing blade, but are stopped prior to starting to cover the opening portion 1a. For the first driving member 11 for the leading blade, the second driving member 12 for the leading blade, the driving member 14 for the trailing blade, and the trailing blade, the positions assumed in this way are the starting positions for the exposing operation.

Thereafter, the electromagnet 6 for the leading blade and the electromagnet 7 for the trailing blade are demagnetized sequentially for prescribed time intervals depending on the brightness of the photographic subject light. The operation after the demagnetization of the electromagnet 6 for the leading blade and the electromagnet 7 for the trailing blade, up through the completion of the exposing operation, are essentially identical to those in the normally open system.

Note that in the setting operation in the present example, as described above, the pushed portion 17d is pushed directly by a member on the camera main unit side, so the set member 17 is rotated against the biasing force of a restoring spring, not shown, but the structure of the focal plane shutter according to the present invention is not limited thereto. The structure may be one wherein another member for setting, operated through a member on the camera main unit side, is attached to the shutter bottom board 1, as is a customary practice, and the set member 17 is rotated to this member, in which case a restoring spring, for restoring the set member 17 to the initial position, may be attached to the set member 17, as in the present example, or may be attached to the other member for setting.

Note that, as already described above, the present invention may be embodied as a lock-type focal plane shutter. When structured as a lock-type focal plane shutter, rather than the set member being returned to the initial position immediately following the completion of the setting operation, it is necessary to return to the initial position prior to the start of the exposing operation, which is the initial stage of imaging, in the same way as for the set member in the example. Given this, the structure wherein the present example is structured from a focal plane shutter of a locking type will be explained briefly.

The iron piece members 13 and 16 are not attached to the second driving member 12 for the leading blade nor to the driving member 14 for the trailing blade, but instead respective engagement portions are formed. Given this, in a state wherein the setting operation of FIG. 5 has been completed, the respective driving members 12 and 14 are rotated to a place past the position wherein the engagement portions thereof are locked to the respective locking members, and the camera release button is pressed so that at the initial stage, wherein the set member 17 returns to the initial position, as in the present example, it is locked to the respective locking members. Moreover, thereafter, the operation up until the set member 17 has returned to the initial position is completely identical to the case in the example described above.

On the other hand, two lock releasing members that are provided in order to release the locking of the respective locking members described above are held attractively by the electromagnet 6 for the leading blade and the electromagnet 7 for the trailing blade, against the biasing forces of the respective springs, prior to the set member 17 starting the operation for returning to the initial position, as described above. Additionally, thereafter, when the set member 17 operates as described above to return to the initial position as illustrated in FIG. 2, the electric current to the individual electromagnets, described above, is cut sequentially. As a result, the respective lock releasing members are affected by the biasing forces of the respective springs to release the locking by the respective locking members, so the second driving member 12 for the leading blade and the driving member 14 for the trailing blade sequentially start the exposing operation. Given this, the two lock releasing members, described above, are caused to contact the respective electromagnets in coordination with the operation of the set member 17. Note that while there are a variety of known structures for producing such an operation, one example is set forth in Japanese Unexamined Patent Application Publication No. 2001-215555.

Another Example

Figure 8:
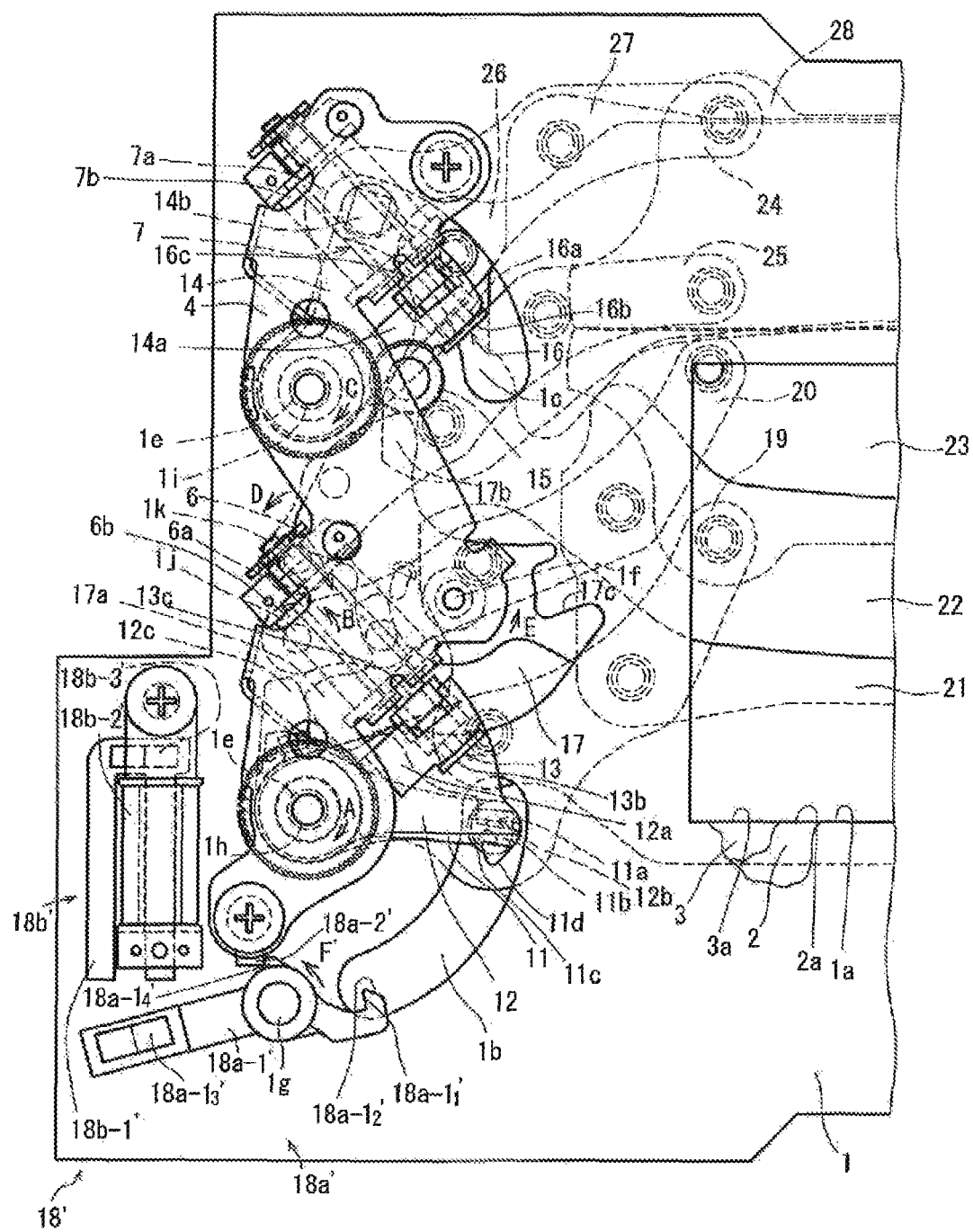
FIG. 8 is a plan view diagram enlarging the about half on the left side, when viewed from the photographic subject side, viewing a state wherein, when capturing an image in the normally open system in a focal plane shutter for a camera according to an Another Example according to the present invention, after the setting operations have been completed, the release button is pressed, a control lever moves out of the travel path for the engagement portion of the first driving member for the leading blade, the lock with the first driving member of the leading blade is unlocked, and the leading blade returns to the position that covers the exposure opening, after which the control lever has moved into the travel path of the engagement portion of the first driving member of the leading blade.

Next the structure of Another Example according to the present invention will be explained using, primarily, FIG. 8. FIG. 8 is a plan view diagram enlarging the about half on the left side, when viewed from the photographic subject side, viewing a state wherein, when capturing an image in the normally open system in a focal plane shutter for a camera according to the Another Example according to the present invention, after the setting operations have been completed, the release button is pressed, a control lever moves out of the travel path for the engagement portion of the first driving member for the leading blade, the lock with the first driving member of the leading blade is unlocked, and the leading blade returns to the position that covers the exposure opening, after which the control lever has moved into the travel path of the engagement portion of the first driving member of the leading blade. Note that, for convenience, those parts that differ from the structure in the Example will be explained, and portions of the explanations for identical structures will be omitted. Note that arrows A through F' are shown only in FIG. 8.

In the focal plane shutter for a camera as set forth in the Another Example, the switching mechanism 18' is attached to the surface side of the shutter bottom board 1 instead of the switching mechanism 18 of the Example. The switching mechanism 18' has a control lever portion 18a' and an electromagnet 18b'.

The control lever portion 18a' has a control lever 18a-1', as a stopping member that is attached rotatably to the shaft 1g that protrudes from the surface side of the shutter bottom board 1, and a stopper 18a-2'. The control lever 18a-1' has, on one end, an engaging portion 18a-11 that is able to lock the engagement portion 11c of the first driving member 11 for the leading blade and is able to lock the rotation, in the counterclockwise direction, of the first driving member 11 for the leading blade, through engaging with an engagement portion 11c, and a pushed portion 18a-12', which is formed to the outside of the engaging portion 18a-11', and has, on the other end, a permanent magnet 18a-13', and a stopper portion 18a-14' between the two ends, in the vicinity of the shaft 1g. The structures of the engaging portion 18a-11' and the pushed portion 18a-12' are essentially identical to the engaging portion 18a-11 and the pushed portion 18a-12 of the Example. The permanent magnet 18a-13', when the electric current in the single direction is removed from the coil 18b-2', produces a magnetic force that acts as a repulsive force in relation to the electromagnet 18b', and, when an electric current in the single direction is applied to the coil 18b-2', produces a magnetic force that acts as an interactive force in relation to the electromagnet 18b'. The stopper 18a-2' is provided on the surface side of the shutter bottom board 1, and stops, at a position away from the vicinity of the bottom end portion of the elongated hole 1b, so as to enable locking of the engaging portion 11c by the engaging portion 18a-11', the control lever 18a-1' that is rotated in the direction of locking the engagement portion 11c of the first driving member 11 for the leading blade by the engaging portion 18a-11' (the counterclockwise direction in the present example, that is, in the direction of the arrow F', centered on the shaft 1g, illustrated in FIG. 15) through contact by the stopper portion 18a-14' of the control lever 18a-1'.

The electromagnet 18b' has a core member 18b-1' wherein tip ends of two leg portions, that each have essentially U shapes, are magnetic pole portions, a bobbin that is fitted onto one of the leg portions of the core member 18b-1', wherein a coil 18b-2' is wound, and a permanent magnet 18b-3', screwed onto the shutter bottom board 1. In the permanent magnet 18b-3', the magnetic pole on the side that is near to the permanent magnet 18a-13' is of the same magnetic pole as the side of the permanent magnet 18a-13' that is on the side that is near to the permanent magnet 18b-3', so has a magnetic force such that the permanent magnet 18b-3' and the permanent magnet 18a-13' oppose each other. In addition, when an electric current in the single direction is applied to the coil 18b-2', the electromagnet 18b' produces a magnetic force that cancels the magnetic force that is produced by the magnetic pole, in the permanent magnet 18b-3', on the side that is near to the permanent magnet 18a-13', causing the magnetic force of the permanent magnet 18a-13' to act as an attractive force in relation to the core member 18b-1', causing the control lever 18a-1' to rotate in the direction that releases the locking of the engagement portion 11c of the first driving member 11 for the leading blade by the engaging portion 18a-11' (which, in the present example, is the clockwise direction). Moreover, when the electric current, in the single direction, is removed from the coil 18b-2', the electromagnet 18b' rotates the control lever 18a-1' in the direction wherein the engagement portion 11c of the first driving member 11 for the leading blade is locked by the engaging portion 18a-11', through the repulsive force of the permanent magnet 18a-13' in relation to the electromagnet 18b' (that is, the counterclockwise direction in the present example). FIG. 1 shows a state wherein the rotation of the control lever 18a-1' in the counterclockwise direction has been stopped by the stopper portion 18a-14' contacting the stopper 18-2' that is provided on the shutter bottom board 1, positioned in the vicinity of the bottom end portion of the elongated hole 1b, wherein the engagement portion 11c of the first driving member 11 for the leading blade can be locked by the engaging portion 18a-11', in a state wherein the electric current in the single direction has been removed from the coil 18b-2'.

Note that when the electric current in the single direction is removed from the coil 18b-2', the permanent magnet 18a-13' may act with an attractive force in relation to the electromagnet 18b', and the electric current in the single direction is applied to the coil 18b-2', the permanent magnet 18a-13' may act with a repulsive force in relation to the electromagnet 18b'. In this case, the permanent magnet 18b-3' is structured with the magnetic pole on the side that is near to the permanent magnet 18a-13' being different from that of the permanent magnet 18a-13', so as to have a magnetic force wherein the permanent magnet 18b-3' and the permanent magnet 18a-13' mutually attract, so that when the electric current is applied, in the single direction, to the coil 18b-2', the electromagnet 18b' cancels the magnetic force produced by the magnetic pole of the permanent magnet 18b-3' on the side that is near to the permanent magnet 18a-13', and so that a magnetic force is produced that is repulsive in relation to the permanent magnet 18a-13'. In addition to this, in the control lever 18a-1', the engaging portion 18a-11' and the pushed portion 18a-2' are formed so that the direction of rotation for the engagement portion 11c of the first driving member 11 for the leading blade to be locked by the engaging portion 18a-11' is the clockwise direction, and the direction of rotation for releasing the locking is the counterclockwise direction. The other structures are essentially identical to the focal plane shutter for the camera as set forth in the Example.

The operations in imaging in a normally open system in the focal plane shutter for a camera according to the Another Example will be explained next using FIG. 8, used in the explanation of the structure, set forth above, and using FIG. 9 through FIG. 14. FIG. 8, as already explained, illustrates a state, in imaging in a normally open system, wherein the control lever is moved outside of the travel path of the engagement portion of the first driving member for the leading blade, through a release button been pressed, releasing the locking of the first driving member for the leading blade, where the leading blade returns to the position that covers the exposure opening, after which the control lever moves into the travel path of the engagement portion of the first driving member of the leading blade. At this time, the operating states of the first driving member 11 for the leading blade, the second driving member 12 for the leading blade, the driving member 14 for the trailing blade, and the set member 17 are the same as for the focal plane shutter for a camera according to the Example, illustrated in FIG. 1.

The electromagnet 18b' goes into a state wherein the electric current, in the single direction, is removed from the coil 18b-2', so no magnetic force is produced that cancels the magnetic force that is produced by the magnetic pole that is on the side that is near to the permanent magnet 18a-13' in the permanent magnet 18b-3. Because of this, the control lever 18a-1' is rotated in the counterclockwise direction through the repulsive force of the permanent magnet 18a-13' in relation to the permanent magnet 18b-3', and the stopper portion 18a-14' is stopped through contacting the stopper 18-2' that is provided on the shutter button board 1, with the engaging portion 18a-11' positioned in the vicinity of the bottom end portion of the elongated hole 1b wherein the first driving member 11 of the leading blade can lock the engagement portion 11c.

After the state illustrated in FIG. 8, the electromagnet 6 for the leading blade and the electromagnet 7 for the trailing blade go into an excited state, so the iron piece members 13 and 16 attractively hold the core members 6a and 7a. Following this, the member on the camera main unit side, not illustrated, removes the pushing force from the pushed portion 17c of the set member 17. As a result, the set member 17 rotates in the counterclockwise direction, due to the biasing force of the restoring spring, not illustrated, to return to the position illustrated in FIG. 9 (where this position shall be termed the "initial position"). At this time, the operating states of the set member 17, the first driving member 11 for the leading blade, the second driving member 12 for the leading blade, the driving member 14 for the trailing blade, the leading blade, and the trailing blade are the same as for the focal plane shutter for a camera according to the Example, illustrated in FIG. 2.

Figure 10:
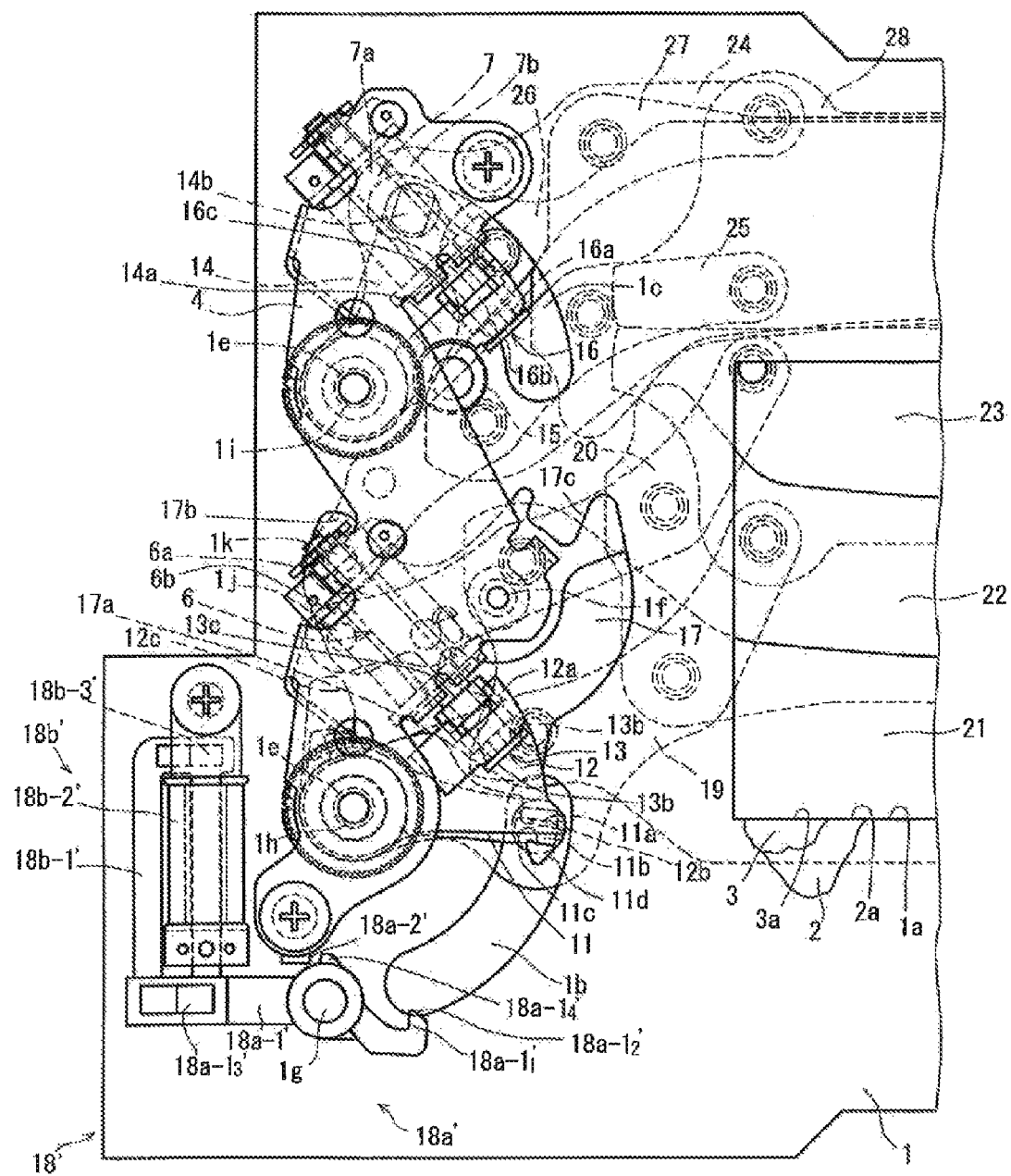
FIG. 10 is a plan view diagram illustrating a state immediately previous to an exposing operation, wherein, from the state in FIG. 9, the control lever has moved to outside of the travel path of the engagement portion of the first driving member for the leading blade.

The position wherein the set member 17 has returned to the initial position from the set position is essentially the same as at the start, where the electromagnet 18b' is supplied an electric current, in the single direction, in the coil 18b-2', so produces a magnetic force that cancels the magnetic force that is produced by the magnetic pole that is on the side that is near, of the permanent magnet 18b-3', to the permanent magnet 18a-13', where the magnetic force of the permanent magnet 18a-13' acts with an attractive force in relation to the core member 18b-1', causing the control lever 18a-1' to rotate in the clockwise direction, and attractively holds the permanent magnet 18a-13' to the core member 18b-1'. As a result, the locking portion 18a-11' retracts to a position away from the vicinity of the bottom end portion of the elongated hole 1b, enabling releasing of the lock of the engagement portion 11c of the first driving member 11 of the leading blade. The state at this time is illustrated in FIG. 10.

The engaging portion 18a-11', after being caused to retract to a position other than the vicinity of the bottom end portion of the elongated hole 1b, enabling releasing of the lock of the engagement portion 11c of the first driving member 11 of the leading blade, the electromagnet 6 for the leading blade and the electromagnet 7 of the trailing blade are sequentially demagnetized for prescribed time intervals depending on the brightness of the photographic subject light, after which the operating states of the first driving member 11 for the leading blade, the second driving member 12 for the leading blade, the leading blade, the driving member 14 for the trailing blade, and the trailing blade are essentially identical to the focal plane shutter for the camera as set forth in the Example until the completion of the exposure operation.

Figure 11:
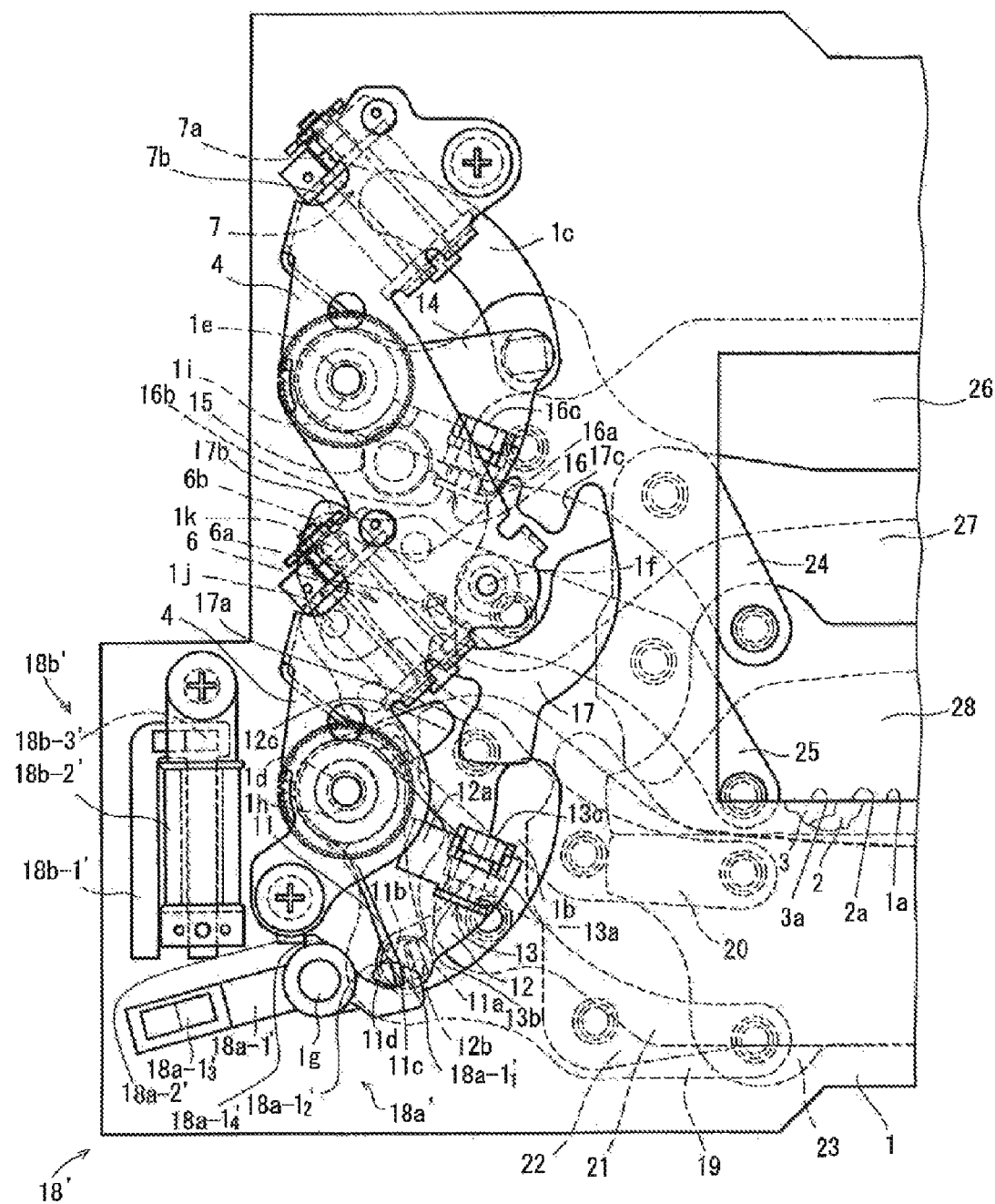
FIG. 11 is a plan view diagram illustrating a state wherein, after the leading blade and the trailing blade have traveled sequentially to complete the exposing operation, the control lever has moved into the travel path for the engagement portion of the first driving member for the leading blade, enabling locking of the first driving member for the leading blade, from the state in FIG. 10.
Figure 12:
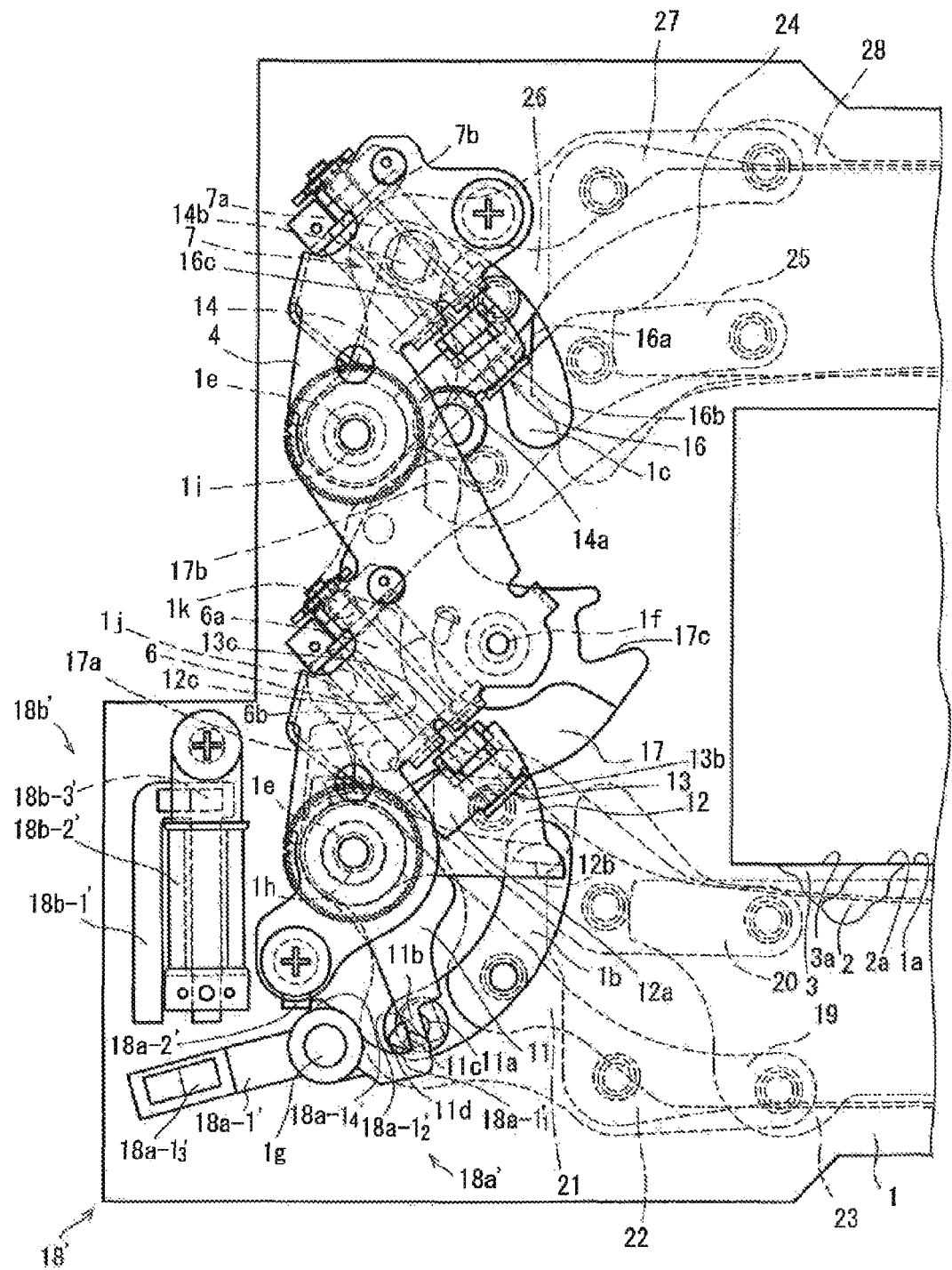
FIG. 12 is a plan view diagram illustrating a state wherein a setting operation has been performed from the state in FIG. 11, in a state wherein the image frame has been opened immediately prior to the completion of the setting operation.
Figure 13:
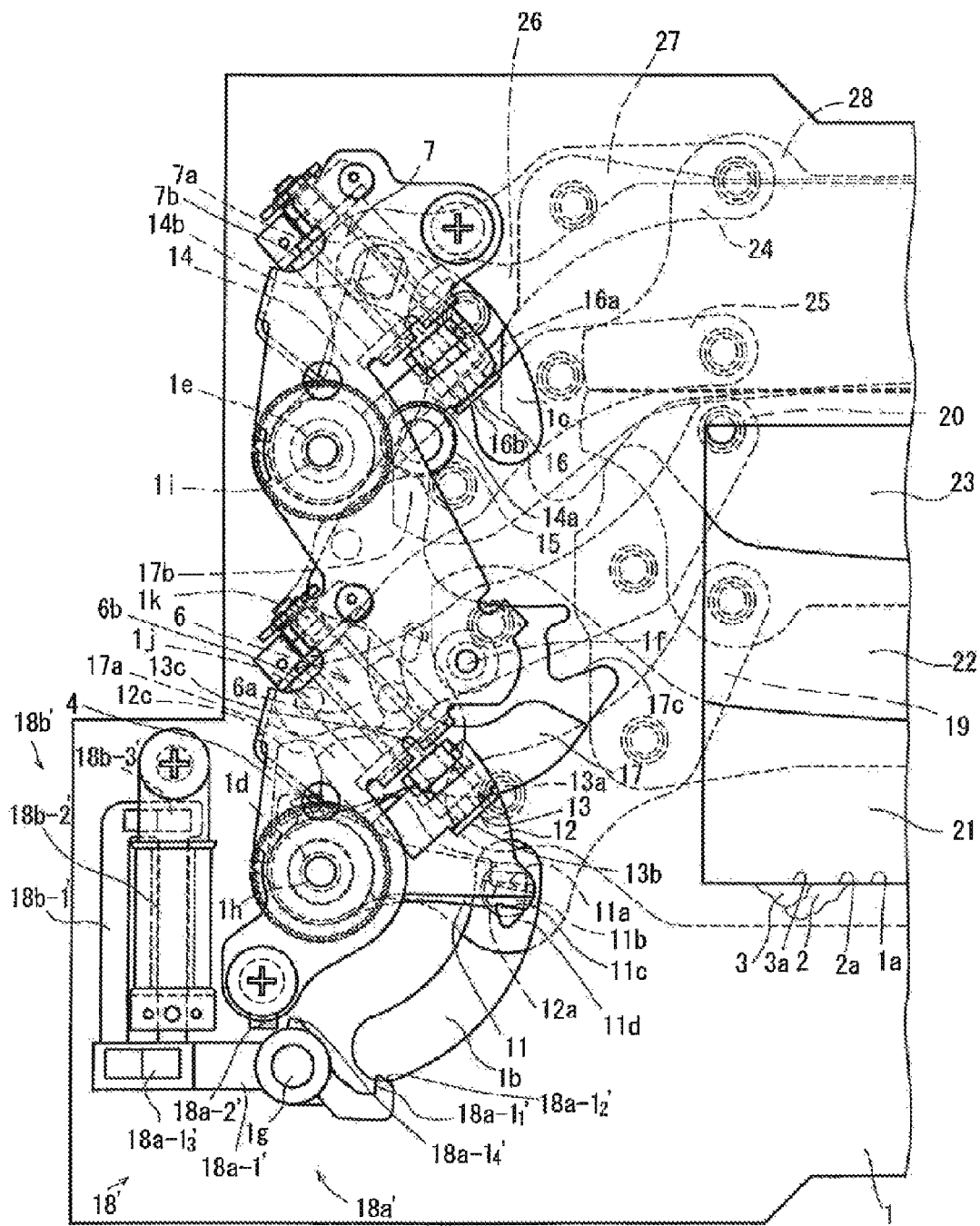
FIG. 13 is a plan view diagram illustrating a state wherein, in the state wherein the setting operation has been completed through the state in FIG. 12, a release button has been pressed, the control lever has moved to outside of the travel path of the engagement portion of the first driving member of the leading blade, the lock of the first driving member for the leading blade has been released, and the leading blade has returned to a position covering the exposure opening.

When the exposing operation is in the completed state, then the image information is immediately transferred from the imaging element to a string device through an information processing circuit. After an amount of time that enables the transfer of the image information has elapsed, the electromagnet 18b' goes into a state wherein the electric current, in the single direction, is removed from the coil 18b-2', so no magnetic force is produced that cancels the magnetic force that is produced by the magnetic pole that is on the side that is near to the permanent magnet 18a-13' in the permanent magnet 18b-3'. As a result, the control lever 18a-1' is rotated in the counterclockwise direction by the repulsive force of the permanent magnet 18a-13' to the core member 18b-3', and is stopped by the stopper portion 18a-14' contacting the stopper 18-2' that is provided on the shutter bottom board 1. At this time, the engaging portion 18a-11' is positioned in the vicinity of the bottom end portion of the elongated hole 1b, enabling the locking of the engagement portion 11c of the first driving member for the leading blade. The state at this time is illustrated in FIG. 11.

Thereafter, the set member 17 begins immediately to rotate in the clockwise direction, with the pushed portion 17c pushed by the member on the camera main unit side, not illustrated. When this occurs, the pushing portion 17a of the set member 17 pushes the pushed portion 12c of the second driving member 12 for the leading blade, and the second driving member 12 for the leading blade begins to be rotated in the counterclockwise direction against the biasing force of the driving spring for the leading blade, not illustrated. At this time, a force that would cause rotation in the counterclockwise direction is applied, through the leading blade, by a set spring, not illustrated, to the first driving member 11 of the leading blade, but the engagement portion 11c of the first driving member 11 for the leading blade contacting the engaging portion 18a-11' of the control lever 18a-1' that is at the position illustrated in FIG. 11 prevents rotation in the counterclockwise direction. Because of this, only the second driving member 12 for the leading blade continues to rotate in the counterclockwise direction, with the three blades 21-23 of the leading blade in a state wherein they remain retracted from the opening portion 1a.

Essentially identically to the time when the pushing portion 17a of the set member 17 pushes the pushed portion 12c of the second driving member 12 for the leading blade, the other pushing portion 17b of the set member 17 pushes the roller 15 that is attached to the driving member 14 for the trailing blade, causing the driving member 14 for the trailing blade to begin to rotate in the counterclockwise direction against the biasing force of the driving spring for the trailing blade, not illustrated. Thereafter, until the completion of the setting operation, the operating states of the set member 17, the driving portion 14 for the trailing blade, the trailing blade, and the second driving member 12 for the leading blade are essentially identical to those for the focal plane shutter for the camera as set forth in the Example.

The case wherein the subsequent imaging operation is performed after the completion of the setting operation in this way will be explained next. In the state wherein the setting operation has been completed through passing through the state illustrated in FIG. 12, the release button on the camera is pressed while an image of the photographic subject is observed in the electronic finder. When this is done, then, prior to the imaging (the exposing operation), the coil 18b-2' is supplied an electric current, in the single direction, so the electromagnet 18b' produces a magnetic force that cancels the magnetic force that is produced by the magnetic pole that is at a position that is near, of the permanent magnet 18b-3', to the permanent magnet 18a-13', where the magnetic force of the permanent magnet 18a-13' acts with an attractive force in relation to the core member 18b-1', causing the control lever 18a-1' to rotate in the clockwise direction, and attractively holds the permanent magnet 18a-13' to the core member 18b-1'. As a result, the engaging portion 18a-11' is caused to retract to a position away from the vicinity of the bottom end portion of the elongated hole 1b, releasing the lock of the engagement portion 11c of the first driving member 11 for the leading blade. Following this, the first driving member 11 for the leading blade, for which the lock for the engagement portion 11c has been released, is rotated in the counterclockwise direction through the biasing force of a set spring for the leading blade, not illustrated. As a result, the three blades 21-23 of the leading blade are moved upward, to return to a position that covers the opening portion 1a. Given this, the driving pin 11b of the first driving member for the leading blade contacting the shock absorbing member, not illustrated, that is attached to the top end portion of the elongated hole 1b stops the action of the first driving member 11 for the leading blade and the action of the leading blade.

Thereafter, the electromagnet 18b' goes into a state wherein the electric current is removed from the coil 18b-2', so no magnetic force is produced that cancels the magnetic force that is produced by the magnetic pole that is positioned near to the permanent magnet 18a-13' in the permanent magnet 18b-3'. As a result, the control lever 18a-1' is rotated in the counterclockwise direction by the repulsive force of the permanent magnet 18a-13' to the core member 18b-3', and is stopped by the stopper portion 18a-14' contacting the stopper 18-2' that is provided on the shutter bottom board 1. At this time, the engaging portion 18a-11' is positioned in the vicinity of the bottom end portion of the elongated hole 1b, enabling the locking of the engagement portion 11c of the first driving member for the leading blade. The state at this time is illustrated in FIG. 8.

In the focal plane shutter according to the Another Example, additionally: the electromagnet 18b' is provided with a second permanent magnet 18b-3' that has a repulsive force in relation to the first permanent magnet 18a-13', wherein, when an electric current in the single direction is applied to the electromagnet 18b', the electromagnet 18b' produces a magnetic force that cancels the repulsive force of the second permanent magnet 18b-3' in relation to the first permanent magnet 18a-13', so the control lever 18a-1' is rotated in the direction for releasing the locking of the engagement portion 11c by the engaging portion 18a-11', through the attractive force of the first permanent magnet 18a-13' in relation to the electromagnet 18b', and when the electric current in the single direction is removed from the electromagnet 18b', the control lever 18a-1' rotates in the direction of the engaging portion 18a-11' locking the engagement portion 11c, through the repulsive force of the second permanent magnet 18b-3' in relation to the first permanent magnet 18a-13', and thus, in relation to the direction of rotation of the control lever 18a-1', the design may be for either the direction that repels, or the direction that attracts, the electromagnet 18b', through the application of the electric current in the single direction to the electromagnet 18b', increasing the flexibility in design. The other operating effects are essentially identical to the focal plane shutter for the camera as set forth in the Example.

Figure 14:
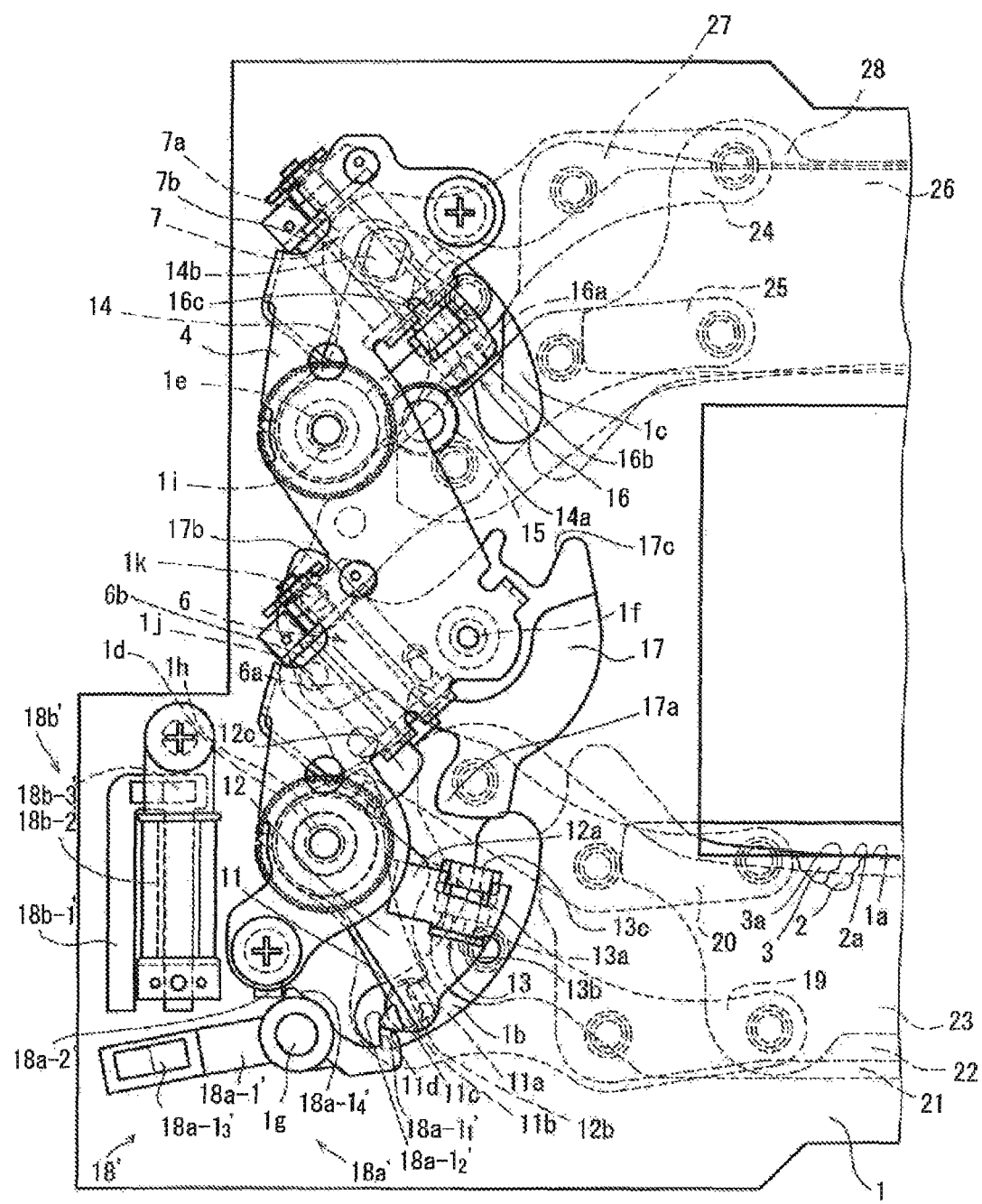
FIG. 14 is a diagram illustrating a modified example of an operation in imaging using the normally open system in a focal plane shutter for a camera according to the Another Example, a diagram illustrating a state wherein the exposing operation is just beginning, without the control lever moving to the outside of the travel path of the engagement portion of the first driving member for the leading blade from the state in FIG. 9, a plan view diagram illustrating a state when the first driving member for the leading blade is stopped, immediately previous to the completion of the exposing operation.

FIG. 14 is a diagram illustrating a modified example of the operation in imaging using a normally open system in a focal plane shutter for a camera according to the Another Example. In this modified example, the exposing operation is started without moving the control lever 18a-1' outside of the travel path of the engagement portion 11c of the first driving member 11 for the leading blade from the state illustrated in FIG. 9. Specifically, the electromagnet 6 for the leading blade and the electromagnet 7 for the trailing blade are demagnetized sequentially, after a prescribed time interval that depends on the brightness of the light from the photographic subject, in a state wherein the control lever 18a-1' is still positioned in the vicinity of the bottom end portion of the elongated hole 1b wherein the engagement portion 11c of the first driving member 11 for the leading blade can be locked. When the electromagnet 6 for the leading blade is demagnetized, the attractive force of the core member 6a in relation to the iron piece member 13 is extinguished causing the second driving member 12 for the leading blade to be rotated quickly in the clockwise direction by the biasing force of the driving spring for the leading blade, not illustrated. At this time, in the second driving member 12 for the leading blade, the pushing portion 12b pushes the pushed portion 11a of the first driving member 11 for the leading blade, causing the first driving member 11 of the leading blade to rotate in the clockwise direction against the biasing force of the set spring for the leading blade, not illustrated, and thus the three blades 21-23 of the leading blade each move downward, each greatly overlapping the adjacent blade, to open the opening portion 1a with the top and edge of the slit-formed blade 23. Additionally, prior to the driving pin 11b of the first driving member 11 for the leading blade contacting the shock absorbing member, not illustrated, that is attached at the bottom end portion of the elongated hole 1b, the pushing portion 11d makes sliding contact with the pushed portion 18a-12' of the control lever 18a-1', pushing the pushed portion 18a-12', so the control lever 18a-1' is rotated in the clockwise direction against the magnetic force of the permanent magnet 18a-13' that is repulsive in relation to the permanent magnet 18b-3'. As a result, the first driving member 11 of the leading blade is stopped. FIG. 14 illustrates the state wherein the first driving member 11 for the leading blade is stopped in this way.

Thereafter, the first driving member 11 for the leading blade, which is pushed by the second driving member 12 for the leading blade, while stopped in its movement by the pushing portion 11d pushing the pushed portion 18a-12' of the control lever 18a-1', the control lever 18a-1' is rotated in the clockwise direction, against the repulsive force of the permanent magnet 18a-13' in relation to the permanent magnet 18b-3'. At this time, the pushed portion 18a-12' of the control lever 18a-1' is retracted to outside of the travel path of the engagement portion 11c of the first driving member 11 for the leading blade, but the repulsive force of the permanent magnet 18a-13' in relation to the permanent magnet 18b-3' is maintained.

Given this, when the driving pin 11b reaches the position wherein it contacts the shock absorbing member, not illustrated that is attached to the bottom end portion of the elongated hole 1b, the pushed portion 18a-12' of the control lever 18a-1' will be in a state wherein it is not pushed, away from the pushing portion 11d. Because of this, the control lever 18a-1' is rotated in the counterclockwise direction by the repulsive force of the permanent magnet 18a-13' in relation to the permanent magnet 18b-3', so the engaging portion 18a-11' locks the engagement portion 11c. Through this, not only will the bound of the first driving member 11 for the leading blade caused to be stationary, but the rotation of the leading blade, by the first driving member 11 for the leading blade, in the direction of closing the exposure opening will be prevented.

At a prescribed time interval after the demagnetization of the electromagnet 6 for the leading blade, the electromagnet 7 for the trailing blade is demagnetized. The operations of the driving portion 14 for the trailing blade and of the trailing blade, after the demagnetization of the electromagnet 7 for the trailing blade until the conclusion of the exposing operation, are essentially identical to those for the focal plane shutter according to the Example.

Figure 9:
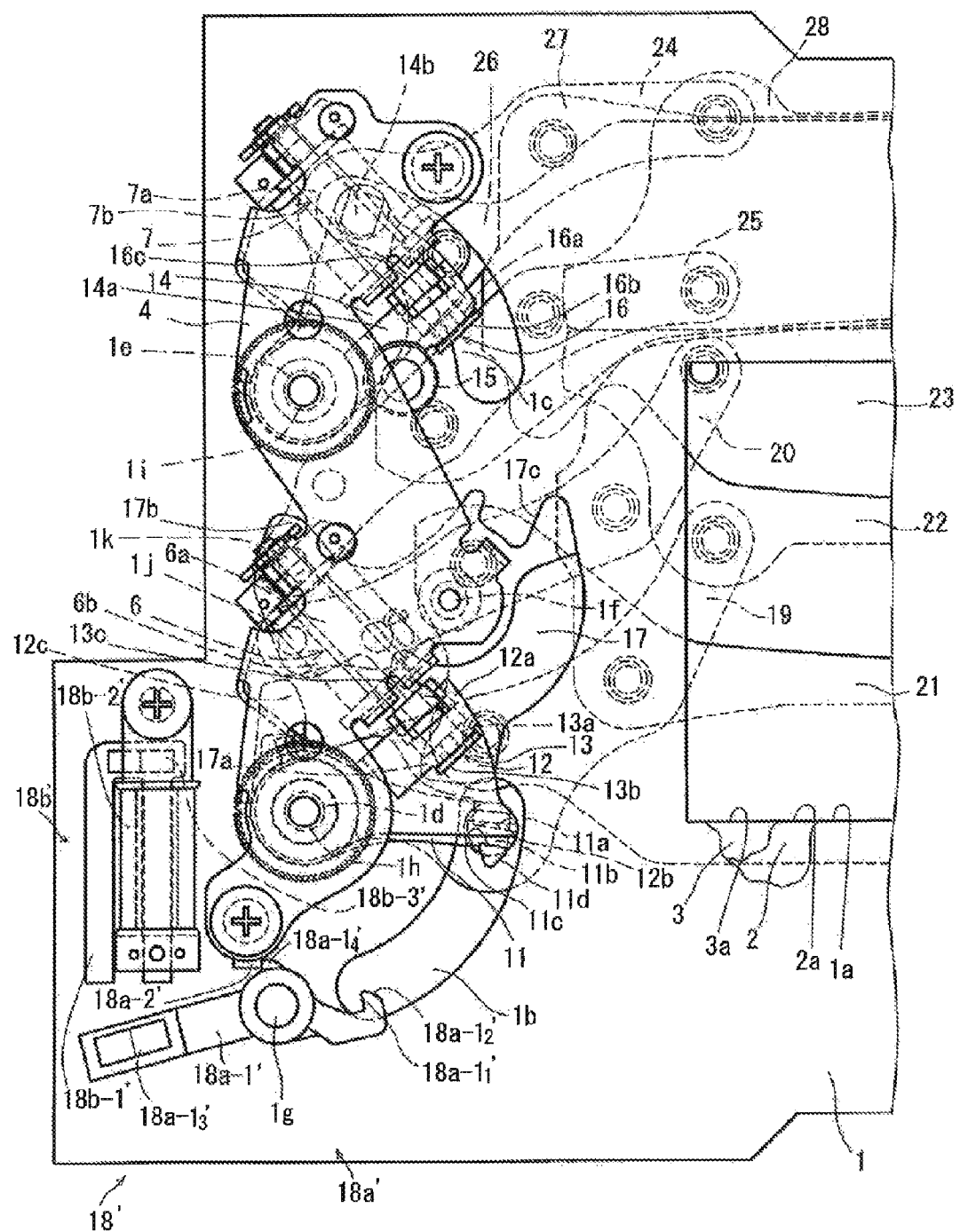
FIG. 9 is a plan view diagram illustrating a state wherein the set member has returned to the initial position from the state in FIG. 8.

Consequently, in the modified example of the Another Example, from the state in FIG. 9 wherein the set member 17 has returned to the initial position, until the end of the exposing operation, the engaging portion 18a-11 can be locked to the engagement portion 11c of the first driving member 11 for the leading blade through the repulsive force of the permanent magnet 18a-13' in relation to the permanent magnet 18b-3', without applying the electric current in the single direction to the coil 18b-2', and without removing the electric current therefrom. Because of this, the frequency with which the electric current is applied in the single direction to the electromagnet 18b', and with which this electric current is removed, in order to lock the engagement portion 11c of the first driving member 11 of the leading blade, using the control lever 18a-1', is reduced to only when the camera release button has been pressed after the setting operation has been completed, to return the first driving member 11 of the leading blade to the set position, making it possible to shorten the time over which the electric current is applied, to thereby enable saving of electric power to that extent. Furthermore, the boundary for the first driving member 11 for the leading blade can be suppressed by controlling the motion of the first driving member 11 for the leading blade, through causing a sliding contact and pushing operation of the pushing portion 11d on the pushed portion 18a-12' of the control lever 18a-1'. Because of this, the time from the completion of an exposing operation until the subsequent setting operation can be shortened even further, enabling an improvement in the continuous photographing speed.

The operation in imaging using a normally closed system in a focal plane shutter for a camera according to the Another Example will be explained next. Imaging in the normally closed system is a case where imaging is performed using an optical finder where, in the case of a camera that is provided with a movable mirror, not illustrated, the movable mirror is in a down state, enabling the photographic subject image to be observed using the optical finder. Moreover, the coil 18b-2' is constantly supplied an electric current, in the single direction, so the electromagnet 18b' produces a magnetic force that cancels the magnetic force that is produced by the magnetic pole on the side, of the permanent magnet 18b-3', that is near to the permanent magnet 18a-13', where the magnetic force of the permanent magnet 18a-13' acts with an attractive force in relation to the core member 18b-1', so the permanent magnet 18a-13' attracts and holds the core member 18b-1', so the engaging portion 18a-11' is maintained in a state that is withdrawn to a position away from the vicinity of the lower end portion of the elongated hole 1b, enabling releasing of the lock of the engagement portion 11c of the first driving member 11 for the leading blade.

The operations from the completion of the exposing operation until the end of the next exposing operation are essentially identical to those in imaging using a normally closed system in a focal plane shutter for a camera according to the Example.

Yet Another Example

Figure 15:
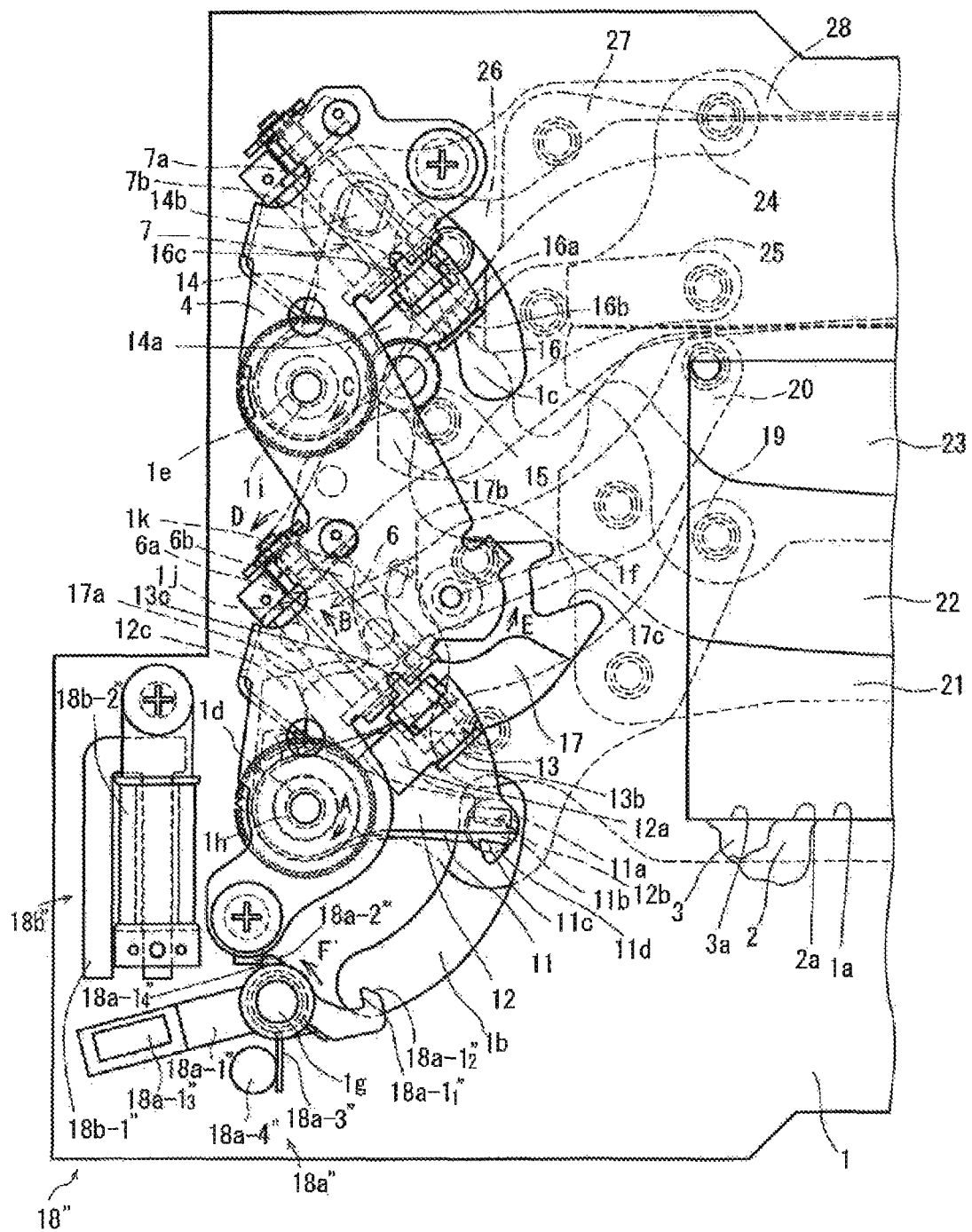
FIG. 15 is a plan view diagram enlarging the about half on the left side, when viewed from the photographic subject side, viewing a state wherein, when capturing an image in the normally open system in a focal plane shutter for a camera according to Yet Another Example according to the present invention, after the setting operations have been completed, the release button is pressed, a control lever moves out of the travel path for the engagement portion of the first driving member for the leading blade, the lock with the first driving member of the leading blade is unlocked, and the leading blade returns to the position that covers the exposure opening, after which the control lever has moved into the travel path of the engagement portion of the first driving member of the leading blade.

Next the structure of Yet Another Example according to the present invention will be explained using, primarily, FIG. 15. FIG. 15 is a plan view diagram enlarging the about half on the left side, when viewed from the photographic subject side, viewing a state wherein, when capturing an image in the normally open system in a focal plane shutter for a camera according to the Yet Another Example according to the present invention, after the setting operations have been completed, the release button is pressed, a control lever moves out of the travel path for the engagement portion of the first driving member for the leading blade, the lock with the first driving member of the leading blade is unlocked, and the leading blade returns to the position that covers the exposure opening, after which the control lever has moved into the travel path of the engagement portion of the first driving member of the leading blade. Note that, for convenience, those parts that differ from the structure in the Example will be explained, and portions of the explanations for identical structures will be omitted. Note that arrows A through F' are shown only in FIG. 15.

In the focal plane shutter for a camera as set forth in the Yet Another Example, the switching mechanism 18" is attached to the surface side of the shutter bottom board 1 instead of the switching mechanism 18 of the Example. The switching mechanism 18" has a control lever portion 18a" and an electromagnet 18b".

The control lever portion 18a" has a control lever 18a-1", as a stopping member that is attached rotatably to the shaft 1g that protrudes from the surface side of the shutter bottom board 1, a stopper 18a-2", an engaging spring 18a-3", and a spring hooking portion 18a-4". The control lever 18a-1" has, on one end, an engaging portion 18a-11" that is able to lock the engagement portion 11c of the first driving member 11 for the leading blade and is able to lock the rotation, in the counterclockwise direction, of the first driving member 11 for the leading blade, through engaging with an engagement portion 11c, and a pushed portion 18a-12", which is formed to the outside of the engaging portion 18a-11", and has, on the other end, an iron piece 18a-13", as a ferromagnetic portion, and a stopper portion 18a-14" between the two ends, in the vicinity of the shaft 1g. The structures of the engaging portion 18a-11" and the pushed portion 18a-12" are essentially identical to the engaging portion 18a-11" and the pushed portion 18a-12 of the Example. The structures of the stopper portion 18a-14" and the stopper 18a-2" are essentially identical to those of the stopper portion 18a-14' and the stopper 18a-2' of the Another Example. The locking spring 18a-3" is fitted onto the shaft 1g and is connected on one end to the control lever 18a-1", and the other end is connected to a spring hooking portion 18a-4", and has a biasing force for causing the control lever 18a-1" to rotate in the direction for locking the engagement portion 11c of the first driving member 11 for the leading blade by the engaging portion 18a-11" (which, in the present Example, is the counterclockwise direction, that is, the direction of the arrow F" around the shaft 1g illustrated in FIG. 15). In addition, the iron piece 18a-13" and the locking spring 18a-3", as described below, function as an operating portion for switching the direction of the force in relation to the electromagnet 18b", depending on the switching between the electric current being applied in the single direction to the electromagnet 18b", or the electric current being removed.

The electromagnet 18b" has a core member 18b-1" wherein the tip ends of each of two essentially U-shaped leg portions are magnetic pole portions, and a bobbin, which is wound with a coil 18b-2", fitted onto one of the leg portions of the core member 18b-1", and is screwed to the shutter bottom board 1. Moreover, when the electric current, in the single direction, is applied to the coil 18b-2", a magnetic force that attracts the iron piece 18a-13" is produced, and the electromagnet 18b" rotates the control lever 18a-1" in the direction wherein the engagement portion 11c of the first driving member 11 for the leading blade is released by the engaging portion 18a-11 (that is, the clockwise direction in the present Example), against the biasing force of the stopping spring 18a-3". Moreover, the electromagnet 18b" goes into a state wherein the electric current, in the single direction, is removed from the coil 18b-2", so no magnetic force that attracts the iron piece 18a-13" is produced. Because of this, the control lever 18a-1" is rotated in the direction for the engagement portion 11c of the first driving member 11 for the leading blade to be locked by the engaging portion 18a-11" (which, in this Example, is the counterclockwise direction) by the biasing force of the locking spring 18a-3". FIG. 15 shows a state wherein the rotation of the control lever 18a-1" in the counterclockwise direction has been stopped by the stopper portion 18a-14" contacting the stopper 18-2" that is provided on the shutter bottom board 1, positioned in the vicinity of the bottom end portion of the elongated hole 1b, wherein the engagement portion 11c of the first driving member 11 for the leading blade can be locked by the engaging portion 18a-11", in a state wherein the electric current in the single direction has been removed from the coil 18b-2". The other structures are essentially identical to the focal plane shutter for the camera as set forth in the Example.

The operation in imaging using the normally open system in the focal plane shutter for a camera according to the Yet Another Example will be explained next using FIG. 15, which was used in the explanation of the structure, above, and using FIG. 16 through FIG. 21. As already explained, FIG. 15 shows a state wherein, when capturing an image in the normally open system, after the setting operations have been completed, the release button is pressed, a control lever 18a-1" moves out of the travel path for the engagement portion 11c of the first driving member 11 for the leading blade, the lock with the first driving member 11 of the leading blade is unlocked, and the leading blade returns to the position that covers the exposure opening, after which the control lever 18a-1" has moved into the travel path of the engagement portion 11c of the first driving member 11 of the leading blade. At this time, the operating states of the first driving member 11 for the leading blade, the second driving member 12 for the leading blade, the driving member 14 for the trailing blade, and the set member 17 are the same as for the focal plane shutter for a camera according to the Example, illustrated in FIG. 1.

The electromagnet 18b" goes into a state wherein the electric current, in the single direction, is removed from the coil 18b-2", so no magnetic force is produced. Because of this, the control lever 18a-1" is rotated in the counterclockwise direction through the biasing force of the stopping spring 18a-3", and the stopper portion 18a-14" is stopped through contacting the stopper 18-2" that is provided on the shutter button board 1, with the engaging portion 18a-11" positioned in the vicinity of the bottom end portion of the elongated hole 1b wherein the first driving member 11 of the leading blade can lock the engagement portion 11c.

After the state illustrated in FIG. 15 has been produced, the electromagnet 6 for the leading blade and the electromagnet 7 for the trailing blade go into an excited state, so the iron piece members 13 and 16 attractively hold the core members 6a and 7a. Following this, the member on the camera main unit side, not illustrated, removes the pushing force from the pushed portion 17c of the set member 17. As a result, the set member 17 rotates in the counterclockwise direction, due to the biasing force of the restoring spring, not illustrated, to return to the position illustrated in FIG. 16 (where this position shall be termed the "initial position"). At this time, the operating states of the set member 17, the first driving member 11 for the leading blade, the second driving member 12 for the leading blade, the driving member 14 for the trailing blade, the leading blade, and the trailing blade are the same as for the focal plane shutter for a camera according to the Example, illustrated in FIG. 2.

Figure 17:
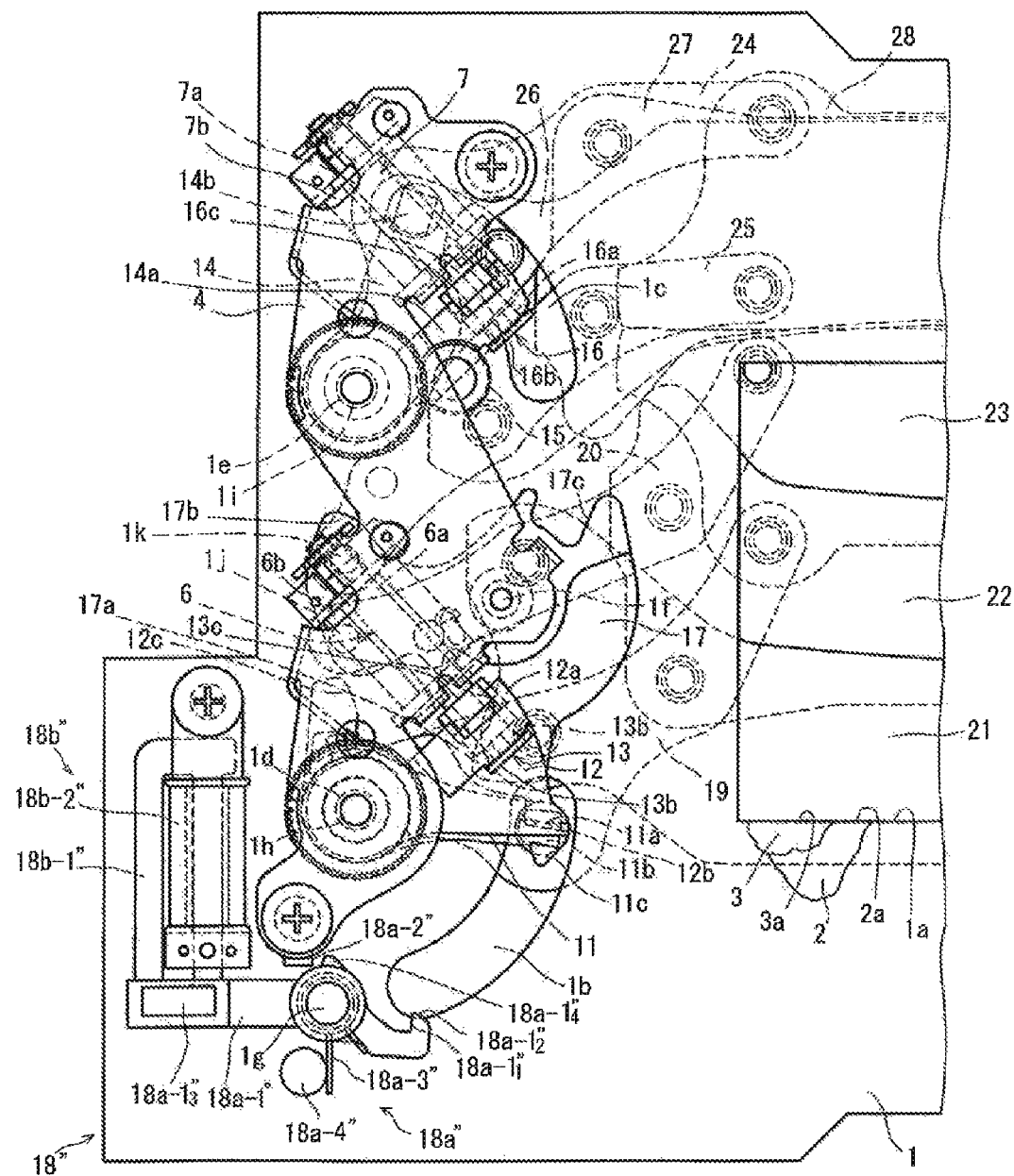
FIG. 17 is a plan view diagram illustrating a state immediately previous to an exposing operation, wherein, from the state in FIG. 16, the control lever has moved to outside of the travel path of the engagement portion of the first driving member for the leading blade.

The position wherein the set member 17 has returned to the initial position from the set position is essentially the same as at the start, where the switching mechanism 18" is supplied an electric current, in the single direction, in the coil 18b-2", so that the electromagnet 18b" produces a magnetic force that attracts the iron piece 18a-13", causing the control lever 18a-1" to rotate in the clockwise direction against the biasing force of the stopping spring 18a-3", so the iron piece 18a-13" is attracted to and held on the core member 18b-1". As a result, the locking portion 18a-11" retracts to a position away from the vicinity of the bottom end portion of the elongated hole 1b, enabling releasing of the lock of the engagement portion 11c of the first driving member 11 of the leading blade. The state at this time is illustrated in FIG. 17.

The engaging portion 18a-1, after being caused to retract to a position other than the vicinity of the bottom end portion of the elongated hole 1b, enabling releasing of the lock of the engagement portion 11c of the first driving member 11 of the leading blade, the electromagnet 6 for the leading blade and the electromagnet 7 of the trailing blade are sequentially demagnetized for prescribed time intervals depending on the brightness of the photographic subject light, after which the operating states of the first driving member 11 for the leading blade, the second driving member 12 for the leading blade, the leading blade, the driving member 14 for the trailing blade, and the trailing blade are essentially identical to the focal plane shutter for the camera as set forth in the Example until the completion of the exposure operation.

Figure 18:
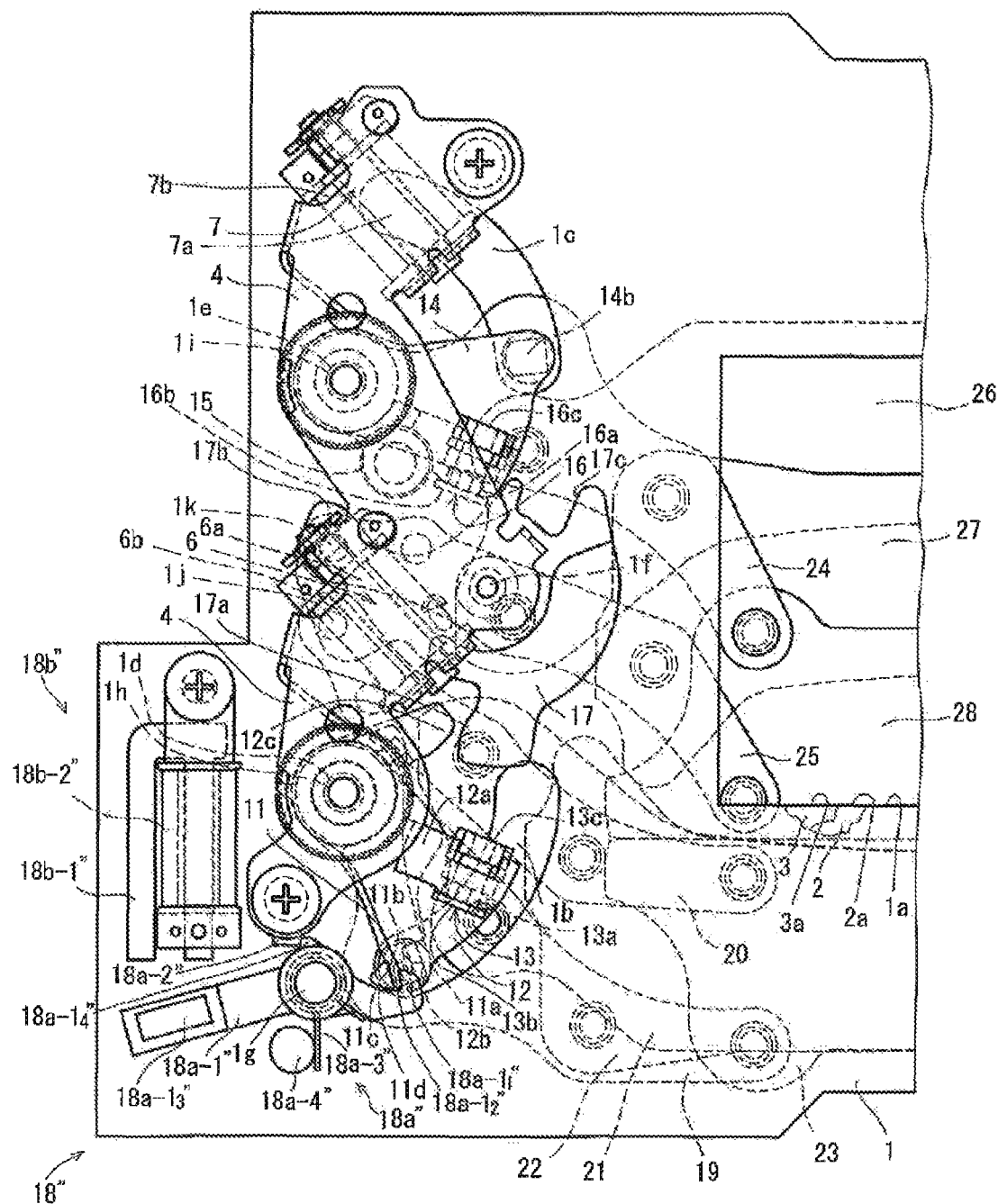
FIG. 18 is a plan view diagram illustrating a state wherein, after the leading blade and the trailing blade have traveled sequentially to complete the exposing operation, the control lever has moved into the travel path for the engagement portion of the first driving member for the leading blade, enabling locking of the first driving member for the leading blade, from the state in FIG. 17.
Figure 19:
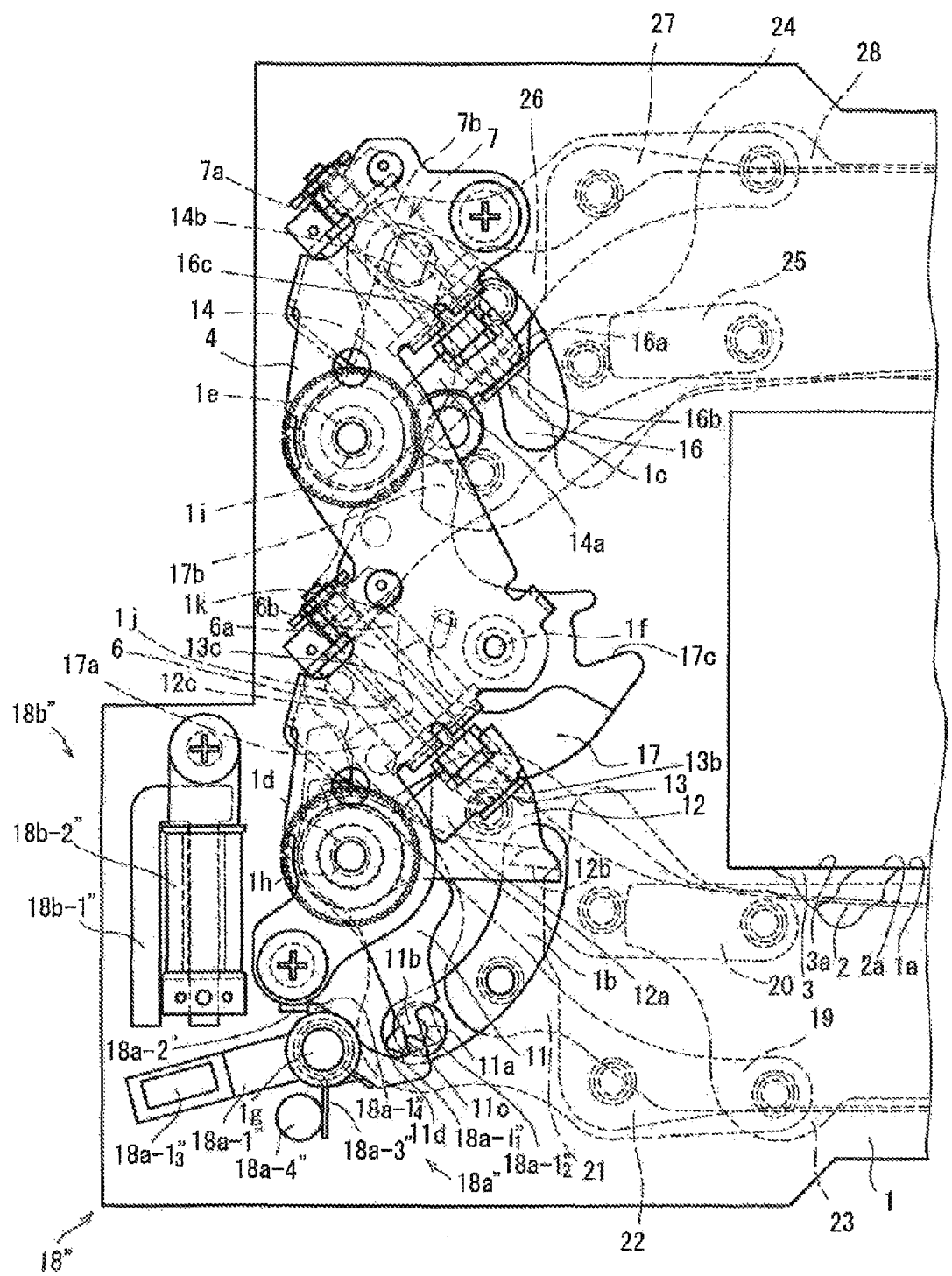
FIG. 19 is a plan view diagram illustrating a state wherein a setting operation has been performed from the state in FIG. 18, in a state wherein the image frame has been opened immediately prior to the completion of the setting operation.
Figure 20:
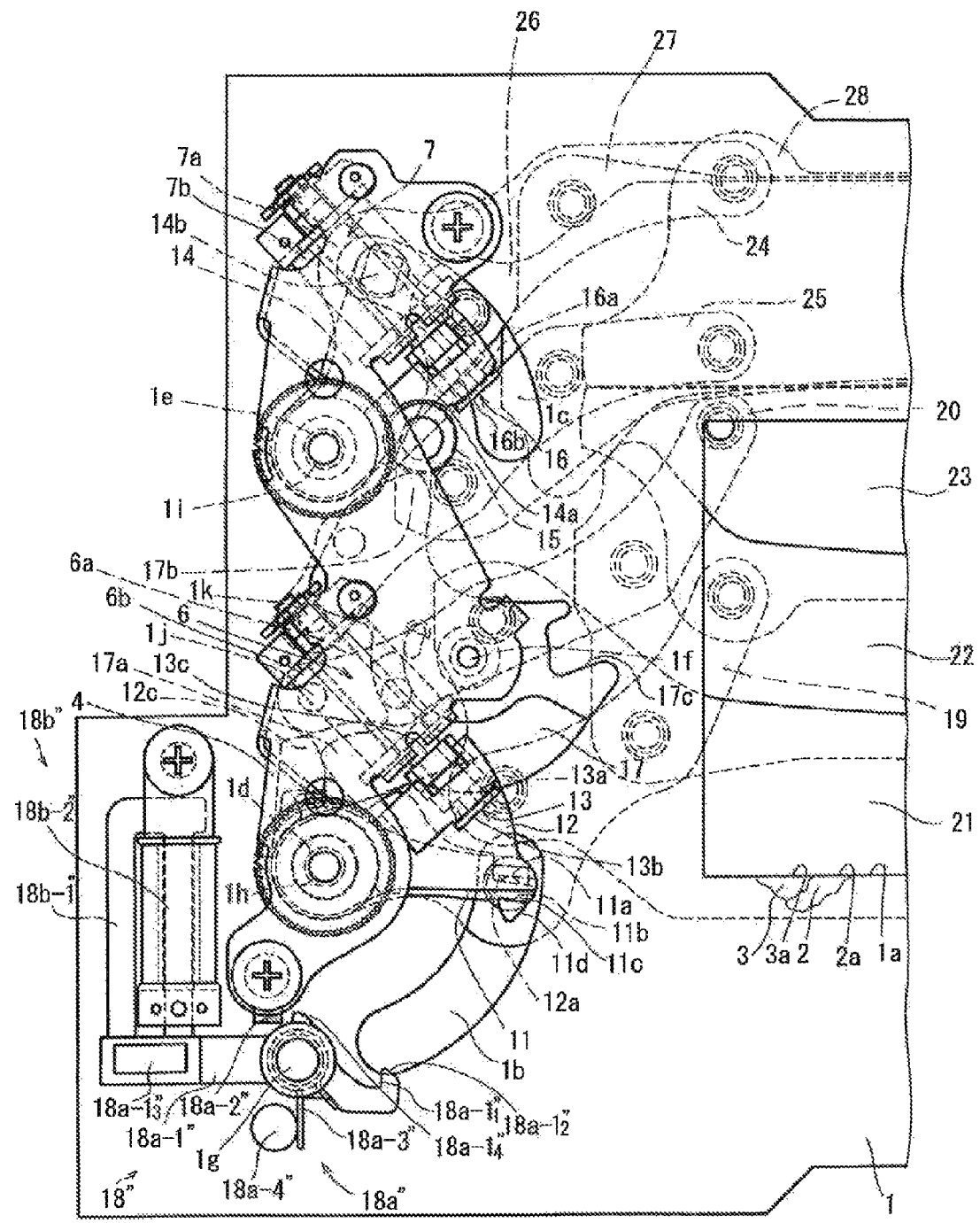
FIG. 20 is a plan view diagram illustrating a state wherein, in the state wherein the setting has been completed through the state in FIG. 19, a release button has been pressed, the control lever has moved to outside of the travel path of the engagement portion of the first driving member of the leading blade, the lock of the first driving member for the leading blade has been released, and the leading blade has returned to a position covering the exposure opening.

When the exposing operation is in the completed state, then the image information is immediately transferred from the imaging element to a string device through an information processing circuit. After a time interval that enables the transfer of the image information has elapsed, then the electric current, in the single direction, is removed from the coil 18b-2", causing the electromagnet 18b" to cease to produce the magnetic force. As a result, the control lever 18a-1" is rotated in the counterclockwise direction by the biasing force of the stopping spring 18a-3", and is stopped by the stopper portion 18-14" contacting the stopper 18-2" that is provided on the shutter bottom board 1. At this time, the engaging portion 18a-11" is positioned in the vicinity of the bottom end portion of the elongated hole 1b, enabling the locking of the engagement portion 11c of the first driving member for the leading blade. The state at this time is illustrated in FIG. 18.

Thereafter, the set member 17 begins immediately to rotate in the clockwise direction, with the pushed portion 17c pushed by the member on the camera main unit side, not illustrated. When this occurs, the pushing portion 17a of the set member 17 pushes the pushed portion 12c of the second driving member 12 for the leading blade, and the second driving member 12 for the leading blade begins to be rotated in the counterclockwise direction against the biasing force of the driving spring for the leading blade, not illustrated. At this time, a force that would cause rotation in the counterclockwise direction is applied, through the leading blade, by a set spring, not illustrated, to the first driving member 11 of the leading blade, but the engagement portion 11c of the first driving member 11 for the leading blade contacting the engaging portion 18*a*-11" of the control lever 18*a*-1" that is at the position illustrated in FIG. 18 prevents rotation in the counterclockwise direction. Because of this, only the second driving member 12 for the leading blade continues to rotate in the counterclockwise direction, with the three blades 21-23 of the leading blade in a state wherein they remain retracted from the opening portion 1*a*.

Essentially identically to the time when the pushing portion 17*a* of the set member 17 pushes the pushed portion 12*c* of the second driving member 12 for the leading blade, the other pushing portion 17*b* of the set member 17 pushes the roller 15 that is attached to the driving member 14 for the trailing blade, causing the driving member 14 for the trailing blade to begin to rotate in the counterclockwise direction against the biasing force of the driving spring for the trailing blade, not illustrated. Thereafter, until the completion of the setting operation, the operating states of the set member 17, the driving portion 14 for the trailing blade, the trailing blade, and the second driving member 12 for the leading blade are essentially identical to those for the focal plane shutter for the camera as set forth in the Example.

The case wherein the subsequent imaging operation is performed after the completion of the setting operation in this way will be explained next. In the state wherein the setting operation has been completed through passing through the state illustrated in FIG. 19, the release button on the camera is pressed while an image of the photographic subject is observed in the electronic finder. At this time, prior to the start of the actual imaging (the exposing operation) the coil 18*b*-2" is supplied an electric current, in the single direction, so that the electromagnet 18*b*" produces a magnetic force that attracts the iron piece 18*a*-13", causing the control lever 18*a*-1" to rotate in the clockwise direction against the biasing force of the stopping spring 18*a*-3", so the iron piece 18*a*-13" is attracted to and held on the core member 18*b*-1". As a result, the engaging portion 18*a*-11" is caused to retract to a position away from the vicinity of the bottom end portion of the elongated hole 1*b*, releasing the lock of the engagement portion 11*c* of the first driving member 11 for the leading blade. Following this, the first driving member 11 for the leading blade, for which the lock for the engagement portion 11*c* has been released, is rotated in the counterclockwise direction through the biasing force of a set spring for the leading blade, not illustrated. As a result, the three blades 21-23 of the leading blade are moved upward, to return to a position that covers the opening portion 1*a*. Given this, the driving pin 11*b* of the first driving member for the leading blade contacting the shock absorbing member, not illustrated, that is attached to the top end portion of the elongated hole 1*b* stops the action of the first driving member 11 for the leading blade and the action of the leading blade.

Thereafter, the electric current, in the single direction, is removed from the coil 18*b*-2", causing the electromagnet 18*b*" to cease to produce the magnetic force. As a result, the control lever 18*a*-1" is rotated in the counterclockwise direction by the biasing force of the stopping spring 18*a*-3", and is stopped by the stopper portion 18*a*-14" contacting the stopper 18-2" that is provided on the shutter bottom board 1. At this time, the engaging portion 18*a*-11" is positioned in the vicinity of the bottom end portion of the elongated hole 1*b*, enabling the locking of the engagement portion 11*c* of the first driving member 11 for the leading blade. The state at this time is illustrated in FIG. 15.

In the focal plane shutter according to the Yet Another Example, the control lever 18*a*-1" is able to rotate around the shaft 1*g*, and has an engaging portion 18*a*-11" on one end, and is provided with a ferromagnetic portion 18*a*-13" on the other end, and further comprises a spring 18-3" for biasing the other end in the direction away from the electromagnet 18*b*", wherein an operating portion is made from the ferromagnetic portion 18*a*-13" and the spring 18-3' for biasing the other end in the direction away from the electromagnet 18*b*"; wherein, when an electric current is applied in the single direction to the electromagnet 18*b*", the electromagnet 18*b*" has an attractive force in relation to the ferromagnetic portion 18*a*-13", causing the control lever 18*a*-1" to rotate in the direction for releasing the locking of the engagement portion 11*c* by the engaging portion 18*a*-11 against the biasing force of the spring 18-3" for biasing in the direction away from the electromagnet 18*b*", through the attractive force of the ferromagnetic portion 18*a*-13" in relation to the electromagnet 18*b*", and, when the electric current is removed from the electromagnet 18*b*", the control lever 18*a*-1" is rotated in the direction wherein the engaging portion 18*a*-11" locks the engagement portion 11*c*, through the force of the spring 18-3" for biasing in the direction away from the electromagnet 18*b*", thus enabling the achievement of a structure wherein no magnet is used in the stopping member. The other operating effects are essentially identical to the focal plane shutter for the camera as set forth in the Example.

Figure 21:
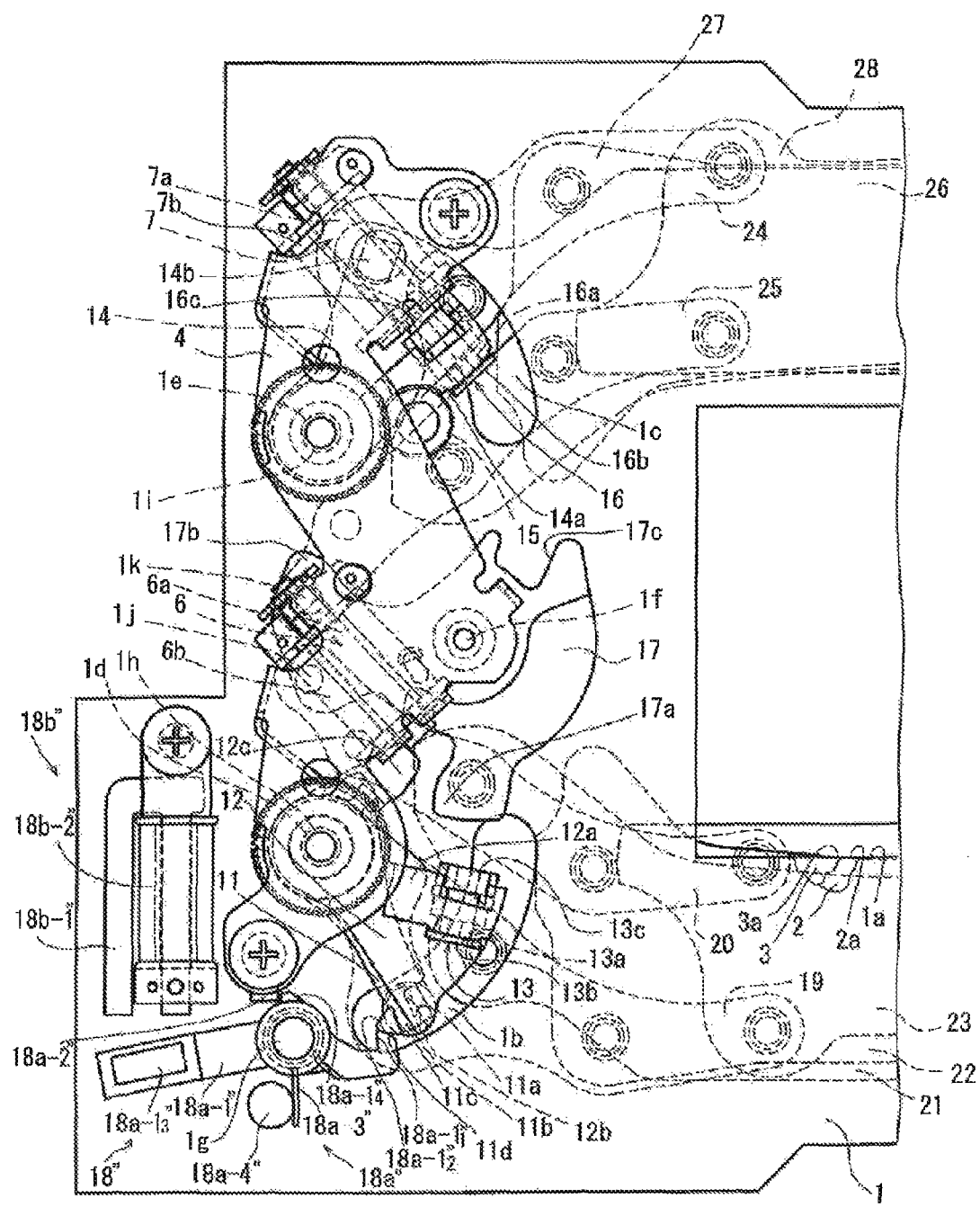
FIG. 21 is a diagram illustrating a modified example of an operation in imaging using the normally open system in a focal plane shutter for a camera according to the Yet Another Example, a diagram illustrating a state wherein the exposing operation is just beginning, without the control lever moving to the outside of the travel path of the engagement portion of the first driving member for the leading blade from the state in FIG. 16, a plan view diagram illustrating a state when the first driving member for the leading blade is stopped, immediately previous to the completion of the exposing operation.

FIG. 21 is a diagram illustrating a modified example of the operation in imaging using a normally open system in a focal plane shutter for a camera according to the Yet Another Example. In this modified example, the exposing operation is started without moving the control lever 18*a*-1" outside of the travel path of the engagement portion 11*c* of the first driving member 11 for the leading blade from the state illustrated in FIG. 16. Specifically, the electromagnet 6 for the leading blade and the electromagnet 7 for the trailing blade are demagnetized sequentially, after a prescribed time interval that depends on the brightness of the light from the photographic subject, in a state wherein the control lever 18*a*-1" of the switching mechanism 18" is still positioned in the vicinity of the bottom end portion of the elongated hole 1*b* wherein the engagement portion 11*c* of the first driving member 11 for the leading blade can be locked. When the electromagnet 6 for the leading blade is demagnetized, the attractive force of the core member 6*a* in relation to the iron piece member 13 is extinguished causing the second driving member 12 for the leading blade to be rotated quickly in the clockwise direction by the biasing force of the driving spring for the leading blade, not illustrated. At this time, in the second driving member 12 for the leading blade, the pushing portion 12*b* pushes the pushed portion 11*a* of the first driving member 11 for the leading blade, causing the first driving member 11 of the leading blade to rotate in the clockwise direction against the biasing force of the set spring for the leading blade, not illustrated, and thus the three blades 21-23 of the leading blade each move downward, each greatly overlapping the adjacent blade, to open the opening portion 1*a* with the top and edge of the slit-formed blade 23. Given this, prior to the driving pin 11*b* of the first driving member 11 for the leading blade contacting the shock absorbing member, not shown, that is attached to the bottom end portion of the elongated hole 1*b*, the pushing portion 11*d* makes sliding contact with the pushed portion 18*a*-12" of the control lever 18*a*-1", pushing the pushed portion 18*a*-12", to rotate the control lever 18*a*-1" in the clockwise direction against the biasing force of the locking spring 18*a*-3". As a result, the first driving member 11 of the leading blade is stopped. FIG. 21 illustrates the state wherein the first driving member 11 for the leading blade is stopped in this way.

Thereafter, the control lever 18a-1" is rotated further in the clockwise direction against the biasing force of the locking spring 18a-3" while the first driving member 11 for the leading blade, which is pushed by the second driving member 12 for the leading blade, is constrained by the pushing portion 11d pushing the pushed portion 18a-12" of the control lever 18a-1". At this time, the pushed portion 18a-12" of the control lever 18a-1" retracts to the outside of the travel path of the engagement portion 11c of the first driving member 11 for the leading blade, but the force for rotating in the counterclockwise direction, applied by the locking spring 18a-3", is maintained.

Given this, when the driving pin 11b reaches the position wherein it contacts the shock absorbing member, not illustrated that is attached to the bottom end portion of the elongated hole 1b, the pushed portion 18a-12" of the control lever 18a-1" will be in a state wherein it is not pushed, away from the pushing portion 11d. Because of this, the control lever 18a-1" is rotated in the counterclockwise direction by the biasing force of the stopping spring 18a-3", so the engaging portion 18a-11" locks the engagement portion 11c. Through this, not only will the bound of the first driving member 11 for the leading blade caused to be stationary, but the rotation of the leading blade, by the first driving member 11 for the leading blade, in the direction of closing the exposure opening will be prevented.

At a prescribed time interval after the demagnetization of the electromagnet 6 for the leading blade, the electromagnet 7 for the trailing blade is demagnetized. The operations of the driving portion 14 for the trailing blade and of the trailing blade, after the demagnetization of the electromagnet 7 for the trailing blade until the conclusion of the exposing operation, are essentially identical to those for the focal plane shutter according to the Example.

Figure 16:
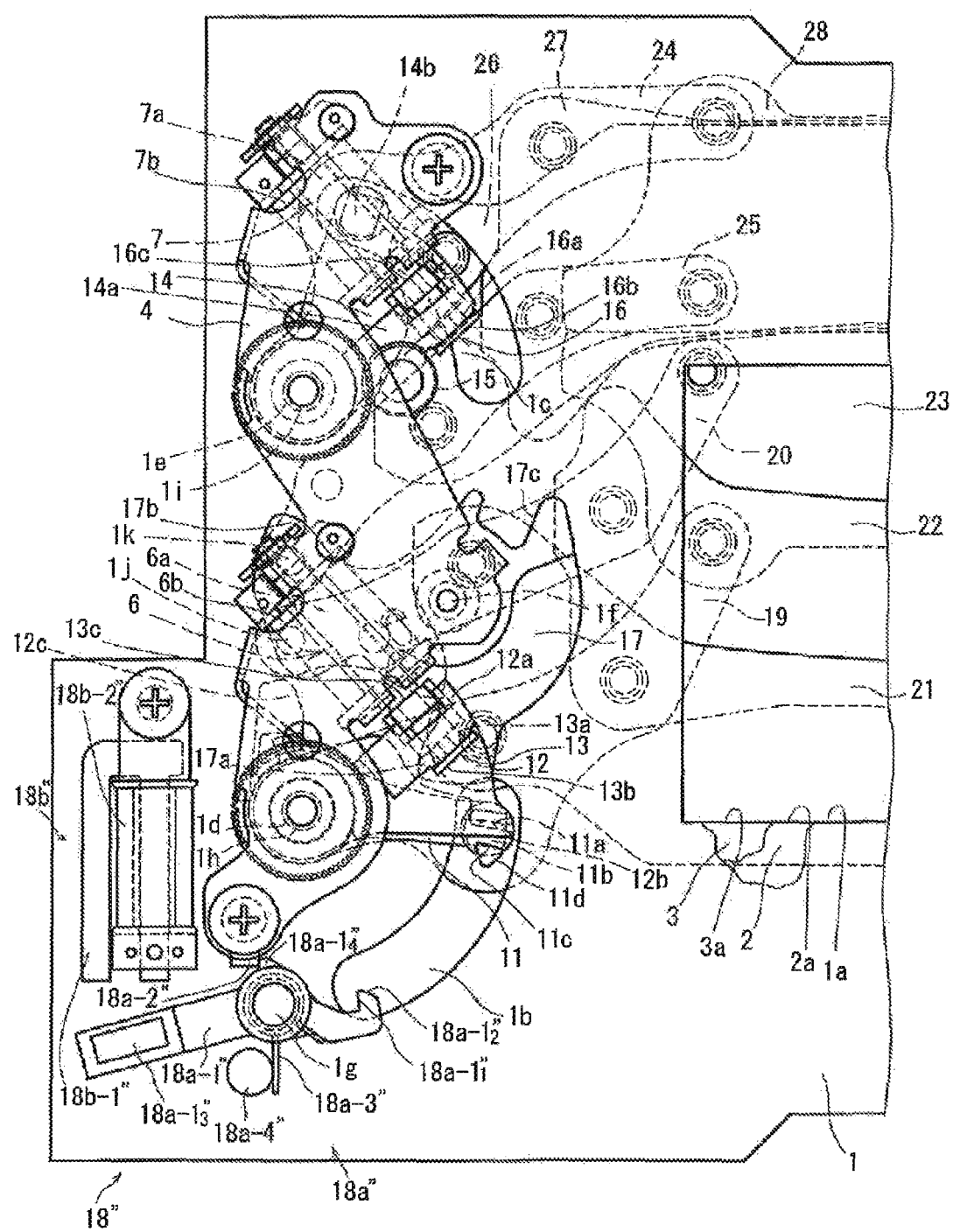
FIG. 16 is a plan view diagram illustrating a state wherein the set member has returned to the initial position from the state in FIG. 15.

Consequently, in the modified example of the Yet Another Example, from the state in FIG. 16 wherein the set member 17 has returned to the initial position, until the end of the exposing operation, the engaging portion 18a-11 can be locked to the engagement portion 11c of the first driving member 11 for the leading blade through the biasing force of the engaging spring 18a-3", without applying the electric current in the single direction to the coil 18b-2", and without removing the electric current therefrom. Because of this, the frequency with which the electric current is applied in the single direction to the electromagnet 18b", and with which this electric current is removed, in order to lock the engagement portion 11c of the first driving member 11 of the leading blade, using the control lever 18a-1", is reduced to only when the camera release button has been pressed after the setting operation has been completed, to return the first driving member 11 of the leading blade to the set position, making it possible to shorten the time over which the electric current is applied, to thereby enable saving of electric power to that extent. Furthermore, the boundary for the first driving member 11 for the leading blade can be suppressed by controlling the motion of the first driving member 11 for the leading blade, through causing a sliding contact and pushing operation of the pushing portion 11d on the pushed portion 18a-2" of the control lever 18a-1". Because of this, the time from the completion of an exposing operation until the subsequent setting operation can be shortened even further, enabling an improvement in the continuous photographing speed.

The operation in imaging using a normally closed system in a focal plane shutter for a camera according to the Yet Another Example will be explained next. Imaging in the normally closed system is a case where imaging is performed using an optical finder where, in the case of a camera that is provided with a movable mirror, not illustrated, the movable mirror is in a down state, enabling the photographic subject image to be observed using the optical finder. Moreover, a current in the single direction is constantly supplied to the coil 18b-2" of the switching mechanism 18", so the electromagnet 18b" produces a magnetic force that attracts the iron piece 18a-13", so the core member 18b-1" attractively holds the iron piece 18a-13", maintaining a state wherein it is withdrawn to a position away from the vicinity of the bottom end portion of the elongated hole 1b, enabling the engaging portion 18a-11" to release the lock of the engagement portion 11c of the first driving member 11 for the leading blade.

The operations from the completion of the exposing operation until the end of the next exposing operation are essentially identical to those in imaging using a normally closed system in a focal plane shutter for a camera according to the Example.

Note that in the focal plane shutter for a camera according to each of the examples set forth above, it is possible to select, through operating mode selecting means, not only imaging through performing an exposing operation using a leading blade and a trailing blade, but also imaging through an exposing operation wherein imaging is started through an electronic shutter and a trailing blade through using an electronic shutter for the imaging element instead of the leading blade, wherein an electronic control circuit controlling an imaging element, without operating the leading blade, and imaging is ended through the trailing blade closing the imaging exposure. Given this, the operations for performing imaging using an exposing operation through an electronic shutter and a trailing blade, using an electronic shutter for the imaging element, will be explained.

In imaging in a system that uses an electronic shutter instead of the leading blade in the focal plane shutter for a camera according to the Example, rather than constantly applying an electric current to the coil 18b-2 of the switching mechanism 18, the control lever 18a-1 is rotated in the clockwise direction by a magnetic force of the permanent magnet 18a-13 that is attractive in relation to the electromagnet 18b-3, to maintain a state wherein it is positioned in the vicinity of the bottom end portion of the elongated hole 1b wherein the engaging portion 18a-11 is able to lock the engagement portion 11c of the first driving member 11 for the leading blade. Moreover, the electromagnet 6 for the leading blade is always in a magnetized state, so a state is maintained wherein the iron piece member 13 is attractively held by the core member 6a. Moreover, the state wherein the setting operation has been completed is a state that is essentially identical to that during imaging in the normally open system.

The case wherein the subsequent imaging operation is performed after the completion of the setting operation in this way will be explained next. When the release button of the camera is pressed while the photographic subject is observed through the electronic finder, then, prior to the start of the actual imaging (the exposing operation), the electromagnet for the trailing blade goes into a magnetized state, so the iron piece 16 is attractively held on the core member 7a. Following this, the member on the camera main unit side, not illustrated, removes the pushing force from the pushed portion 17c of the set member 17, so the set member 17 is rotated in the counterclockwise direction by the biasing force of the restoring spring, not shown, to be returned to the initial position. In the initial stage of this returning action, in the set member 17 the pushing portion 17a moves away from the pushed portion 12c of the second driving member 12 for the leading blade, and the pushing portion 17b moves away from the roller 15 that is attached to the driving member 14 of the trailing blade, and thus the second driving member 12 for the leading blade and the driving member 14 for the trailing blade are rotated in the clockwise direction by the biasing forces of the driving spring for the leading blade and the driving spring for the trailing blade, not illustrated. In this, the second driving member 12 for the leading blade is stopped by the pushing member 12b contacting the pushed portion 11a of the first driving member 11 for the leading blade. Moreover, because the iron piece 16 is attractively held by the core member 7a, the driving member 14 for the trailing blade is stopped, at a slightly rotated position, by the attaching portion 14a contacting the head portion 16b of the iron piece 16.

The three blades 26-28 of the trailing blade are also moved slightly upward through the slight rotation against the biasing force of the set spring for the trailing blade, not illustrated, through the slight rotation of this type of driving member 14 of the trailing blade, but are stopped prior to starting to cover the opening portion 1a. For the second driving member 12 for the leading blade, the driving member 14 for the trailing blade, and the trailing blade, the positions assumed in this way are the starting positions for the exposing operation.

After the set member 17 has returned to the initial position, then the electronic shutter that replaces the leading blade is turned ON and the electronic control circuit controls the imaging element to start the imaging. After this, when a prescribed time that is determined corresponding to the brightness of the photographic subject has elapsed, the electromagnet for the trailing blade is demagnetized. When the electromagnet for the trailing blade is demagnetized, the attractive force of the core member 7 in relation to the iron piece member 16 is extinguished causing the driving member 14 for the trailing blade to be rotated quickly in the clockwise direction by the biasing force of the driving spring for the trailing blade, not illustrated. Because at this time, the driving member 14 for the trailing blade is rotated in the clockwise direction against the biasing force of the set spring for the trailing blade, the three blades 26-28 of the trailing blade move downward, each slightly overlapping the adjacent blades, to close the opening portion 1a with the bottom end edge of the slit-formed blade 28.

When the exposing operation reaches its final stage through performing this, the driving pin 14b of the driving member 14 for the trailing blade contacting the shock absorbing member, not illustrated, that is attached to the bottom end portion of the elongated hole 1c stops the action of the driving member 14 for the trailing blade and the action of the trailing blade. Moreover, at essentially the same time as the driving pin 14b of the driving member 14 for the trailing blade contacting the shock absorbing member described above, the electronic shutter that replaces the leading blade is turned OFF, ending the exposing operation. The state at this time is essentially identical to the state at the end of the exposing operation in imaging in the normally open system. The state immediately following the end of the exposing operation through the state at the end of the setting operation are essentially identical to those in the operations in imaging in the normally open system.

In a system that uses an electronic shutter instead of the leading blade in the focal plane shutter for a camera according to the Another Example, rather than applying an electric current constantly to the coil 18b-2' of the switching mechanism 18', and rather than the electromagnet 18b' producing a magnetic force for canceling the magnetic force that is produced from the magnetic pole of the permanent magnet 18b-3' on the side that is near to the permanent magnet 18a-13', the control lever 18a-1' is rotated in the counterclockwise direction by the magnetic force of the permanent magnet 18a-13' that is repulsive in relation to the permanent magnet 18b-3', and is maintained in a state wherein it is positioned in the vicinity of the bottom end portion of the elongated hole 1b wherein the engaging portion 18a-11' is able to lock the engaging portion 11c of the first driving member for the leading blade. Moreover, the electromagnet 6 for the leading blade is always in a magnetized state, so a state is maintained wherein the iron piece member 13 is attractively held by the core member 6a. Moreover, the state wherein the setting operation has been completed is a state that is essentially identical to that during imaging in the normally open system.

The operation in the case of performing the subsequent imaging, after the completion of the setting operation in this way is essentially identical to that of the system wherein an electronic shutter is used instead of the leading blade in the focal plane shutter for a camera according to the Example. Note that the state at the end of the exposing operation is essentially identical to the state at the end of the exposing operation in imaging using a normally open system. The state at this time is essentially identical to the state at the end of the exposing operation in imaging in the normally open system. Moreover, the state immediately following the end of the exposing operation through the state at the end of the setting operation are essentially identical to those in the operations in imaging in the normally open system.

In a system that uses an electronic shutter instead of the leading blade in the focal plane shutter according to the Yet Another Example, when imaging is performed using an electronic finder in a camera that is equipped with a movable mirror, not shown, the movable mirror will be in the up state. Moreover, rather than applying an electric current constantly to the coil 18b-2" of the switching mechanism 18", and rather than the electromagnet 18b" producing a magnetic force, the control lever 18a-1" is rotated in the counterclockwise direction by the biasing force of the locking spring 18a-3", to be held in a state wherein it is positioned in the vicinity of the bottom end portion of the elongated hole 1b, wherein the engaging portion 18a-11" is able to lock the engagement portion 11c of the first driving member 11 for the leading blade. Moreover, the electromagnet 6 for the leading blade is always in a magnetized state, so a state is maintained wherein the iron piece member 13 is attractively held by the core member 6a. Moreover, the state wherein the setting operation has been completed is a state that is essentially identical to that during imaging in the normally open system.

The operation in the case of performing the subsequent imaging, after the completion of the setting operation in this way is essentially identical to that of the system wherein an electronic shutter is used instead of the leading blade in the focal plane shutter for a camera according to the Example. The state at the completion of the exposing operation is essentially identical to the state at the end of the exposing operation in imaging in the normally open system. Moreover, the state immediately following the end of the exposing operation through the state at the end of the setting operation are essentially identical to those in the operations in imaging in the normally open system.

The invention claimed is:

1. A focal plane shutter for a camera comprising:
a blade group opening and closing an exposure opening;

a first driving member driving the blade group to close the exposure opening;

a first spring configured to bias the first driving member to rotate;

a second driving member driving the blade group to open the exposure opening by pushing the first driving member against the biasing force of the first spring;

a second spring configured to bias the second driving member to rotate; and a stopping member rotatably positioned on an axis, comprising an engaging portion configured to engage the first driving member and an operating portion configured to move according to a state of an electrical current applied to an electromagnet, wherein:

depending on whether or not the electrical current is applied to the electromagnet, a state will be produced where either:

the engaging portion is able to contact the first driving member, or the engaging portion cannot contact the first driving member.

2. The focal plane shutter for a camera as set forth in claim 1, wherein:

when the electrical current is applied to the electromagnet, the engaging portion cannot engage the first driving member; and when no electrical current is applied to the electromagnet, the engaging portion can engage the first driving member.

3. The focal plane shutter for a camera as set forth in claim 1, wherein:

the first driving member includes an engageable portion; and the engaging portion of the stopping member stops rotation of the first driving member in the direction for closing the exposure opening by engaging the engageable portion.

4. The focal plane shutter for a camera as set forth claim 1, wherein:

in the electromagnet, the electrical current can only be applied in one direction.

5. The focal plane shutter for a camera as set forth claim 1, wherein:

the operating portion includes an iron piece that rotates together with the stopping member when an electrical current is applied to the electromagnet, and an operating spring for biasing the stopping member to rotate.

6. The focal plane shutter for a camera as set forth claim 1, further comprising a leading blade driving spring for driving the leading blade, and wherein:

the blade group includes a leading blade;

the first driving member is a leading blade first driving member for driving the leading blade;

the second driving member is a leading blade second driving member for driving the leading blade.

7. The focal plane shutter for a camera as set forth in claim 1, further comprising:

a trailing blade group opening and closing the exposure opening;

a trailing blade driving member driving the trailing blade group; and a trailing blade driving spring applying a biasing force so as to rotate the trailing blade driving member.

8. The focal plane shutter for a camera as set forth in claim 7, further comprising:

a shutter base plate, wherein:

the leading blade first driving member and the leading blade second driving member are rotatably attached to a first axis of the shutter base plate; and the trailing blade driving member is rotatably attached to a second axis of the shutter base plate.

9. The focal plane shutter for a camera as set forth in claim 1, further comprising:

a set member which, at the time of a setting operation, rotates from an initial position to rotate the leading blade second driving member and the trailing blade driving member against the biasing forces of the leading blade driving spring and the trailing blade driving spring to return to an initial position prior to starting an exposure operation; and the set member is rotatably attached to a third axis of the shutter base plate.

10. The focal plane shutter for a camera as set forth in claim 1, wherein:

the stopping member is rotatably attached to a fourth axis of the shutter base plate.

11. A camera equipped with the focal plane shutter for a camera as set forth in claim 1.

12. The focal plane shutter for a camera as set forth in claim 1, wherein:

when the electrical current is applied to the electromagnet, the engaging portion cannot engage the first driving member; and when no electrical current is applied to the electromagnet, the engaging portion can engage the first driving member.

13. The focal plane shutter for a camera as set forth in claim 12, wherein:

the first driving member includes an engageable portion; and the engaging portion of the stopping member stops rotation of the first driving member in the direction for closing the exposure opening by engaging the engageable portion.

14. The focal plane shutter for a camera as set forth claim 13, wherein:

in the electromagnet, the electrical current can only be applied in one direction.

15. The focal plane shutter for a camera as set forth claim 14, wherein:

the operating portion includes an iron piece that rotates together with the stopping member when an electrical current is applied to the electromagnet, and an operating spring for biasing the stopping member to rotate.

16. The focal plane shutter for a camera as set forth claim 15, further comprising a leading blade driving spring for driving the leading blade, and wherein:

the blade group includes a leading blade;

the first driving member is a leading blade first driving member for driving the leading blade;

the second driving member is a leading blade second driving member for driving the leading blade.

17. The focal plane shutter for a camera as set forth in claim 16, further comprising:

a trailing blade group opening and closing the exposure opening;

a trailing blade driving member driving the trailing blade group; and a trailing blade driving spring applying a biasing force so as to rotate the trailing blade driving member.

18. The focal plane shutter for a camera as set forth in claim 17, further comprising:

a shutter base plate, wherein:

the leading blade first driving member and the leading blade second driving member are rotatably attached to a first axis of the shutter base plate; and the trailing blade driving member is rotatably attached to a second axis of the shutter base plate.

19. The focal plane shutter for a camera as set forth in claim 18, further comprising:

a set member which, at the time of a setting operation, rotates from an initial position to rotate the leading blade second driving member and the trailing blade driving member against the biasing forces of the leading blade driving spring and the trailing blade driving spring to return to an initial position prior to starting an exposure operation;

the set member is rotatably attached to a third axis of the shutter base plate; and the stopping member is rotatably attached to a fourth axis of the shutter base plate.

20. A camera equipped with the focal plane shutter for a camera as set forth in claim 19.

* * * * *